(12) United States Patent
Saori et al.

(10) Patent No.: US 9,784,950 B2
(45) Date of Patent: Oct. 10, 2017

(54) ZOOM LENS SYSTEM AND ELECTRONIC IMAGING APPARATUS USING THE SAME

(71) Applicant: RICOH IMAGING COMPANY, LTD., Tokyo (JP)

(72) Inventors: Masakazu Saori, Saitama (JP); Yoshimitsu Ohara, Tokyo (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 14/426,558

(22) PCT Filed: Jul. 1, 2013

(86) PCT No.: PCT/JP2013/068051
§ 371 (c)(1),
(2) Date: Mar. 6, 2015

(87) PCT Pub. No.: WO2014/041873
PCT Pub. Date: Mar. 20, 2014

(65) Prior Publication Data
US 2015/0241657 A1    Aug. 27, 2015

(30) Foreign Application Priority Data

Sep. 11, 2012 (JP) ................... 2012-199428

(51) Int. Cl.
*G02B 13/00* (2006.01)
*G02B 15/17* (2006.01)
(Continued)

(52) U.S. Cl.
CPC .......... *G02B 13/009* (2013.01); *G02B 15/14* (2013.01); *G02B 15/173* (2013.01); *G02B 15/177* (2013.01); *H04N 5/2254* (2013.01)

(58) Field of Classification Search
None
See application file for complete search history.

(56) References Cited

U.S. PATENT DOCUMENTS 8,174,774 B2 * 5/2012 Eguchi ............... G02B 15/173
359/687

2002/0101661 A1 8/2002 Harada
(Continued)

FOREIGN PATENT DOCUMENTS

JP 06-051202 2/1994
JP 2002-162564 6/2002
(Continued)

OTHER PUBLICATIONS

International Search Report for World Intellectual Property Organization, dated Oct. 8, 2013.

*Primary Examiner* — Roberto Velez
*Assistant Examiner* — Quan Pham
(74) *Attorney, Agent, or Firm* — Greenblum & Bernstein, P.L.C.

(57) ABSTRACT

A zoom lens system includes a positive first lens group, a negative second lens group, a positive third lens group, and a positive fourth lens group. The second and third lens groups are moved during zooming. The first lens group includes a positive first sub-lens group which does not move during a focusing operation, and a positive second sub-lens group which moves during the focusing operation. The first sub-lens group includes at least one negative lens element, the second sub-lens group is a positive single lens element, and the following conditions (1) and (2) are satisfied:

$$60 < \nu d1b < 75 \quad (1),$$

and $$\nu d1a < 24 \quad (2),$$

wherein $\nu d1b$ and $\nu d1a$_designates Abbe numbers at the d-line of the positive single lens element of the second sub-lens group and at the d-line of the negative lens element within the first sub-lens group, respectively.

17 Claims, 25 Drawing Sheets

(51) Int. Cl.
   *G02B 15/14*     (2006.01)
   *H04N 5/225*     (2006.01)
   *G02B 15/173*    (2006.01)
   *G02B 15/177*    (2006.01)

(56) References Cited

U.S. PATENT DOCUMENTS

| | | | |
|---|---|---|---|
| 2006/0066952 A1* | 3/2006 | Ohtake | G02B 27/646 |
| | | | 359/676 |
| 2006/0215279 A1 | 9/2006 | Shibayama | |
| 2007/0002443 A1* | 1/2007 | Toyama | G02B 27/646 |
| | | | 359/557 |
| 2007/0014032 A1* | 1/2007 | Otake | G02B 27/646 |
| | | | 359/692 |
| 2008/0043342 A1 | 2/2008 | Yamamoto et al. | |
| 2011/0176225 A1* | 7/2011 | Shinohara | G02B 15/173 |
| | | | 359/687 |
| 2012/0243107 A1* | 9/2012 | Abe | G02B 15/177 |
| | | | 359/680 |
| 2013/0229564 A1 | 9/2013 | Saori | |
| 2014/0118840 A1 | 5/2014 | Enomoto | |

FOREIGN PATENT DOCUMENTS

| | | |
|---|---|---|
| JP | 2004-085846 | 3/2004 |
| JP | 2006-267425 | 10/2006 |
| JP | 2008-046319 | 2/2008 |

\* cited by examiner

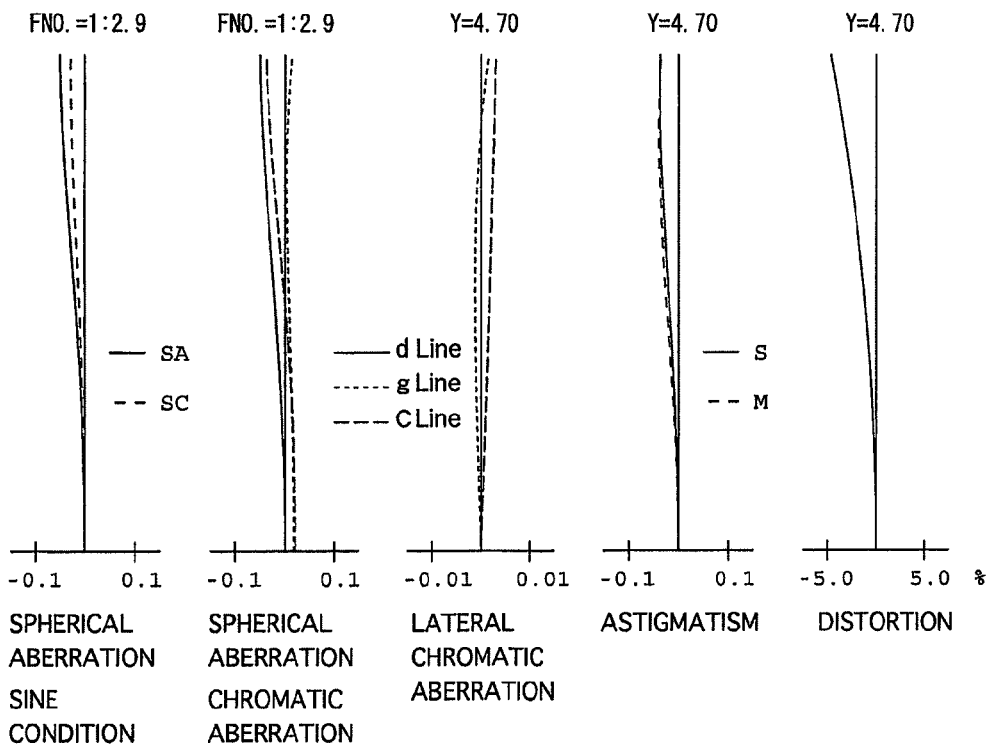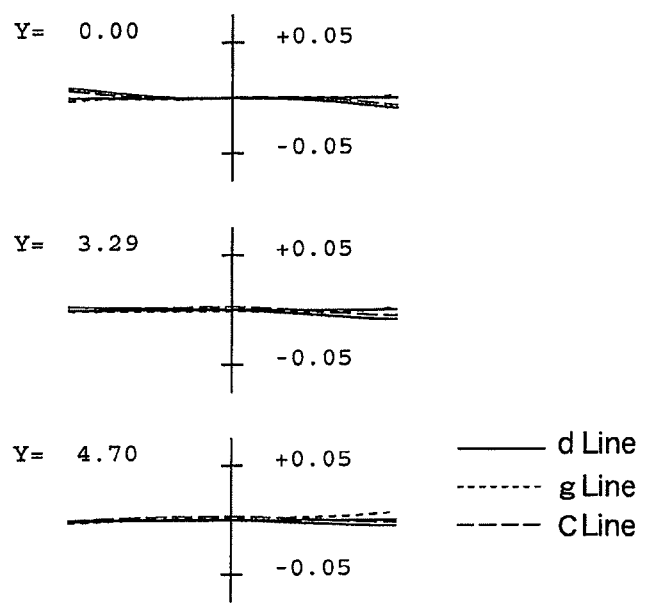

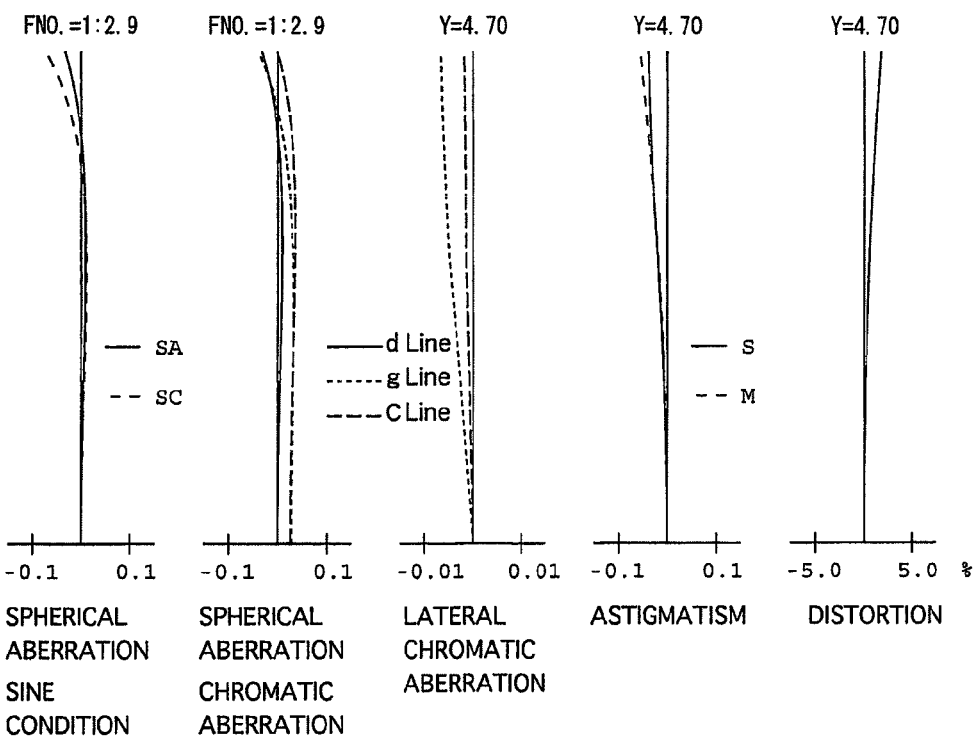
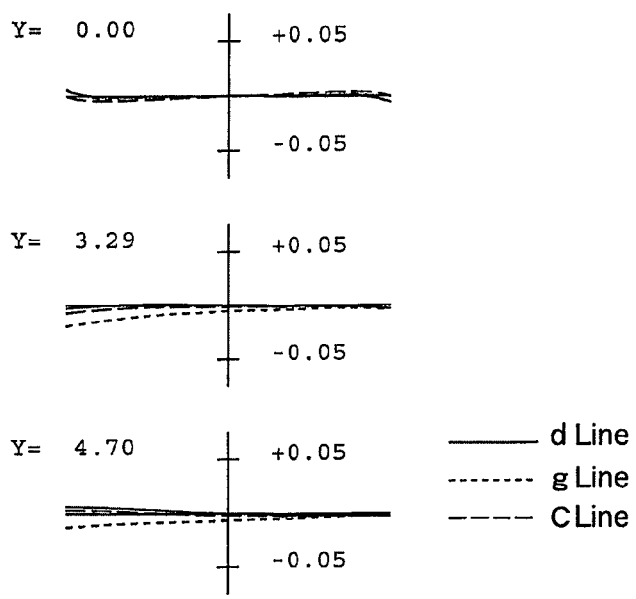

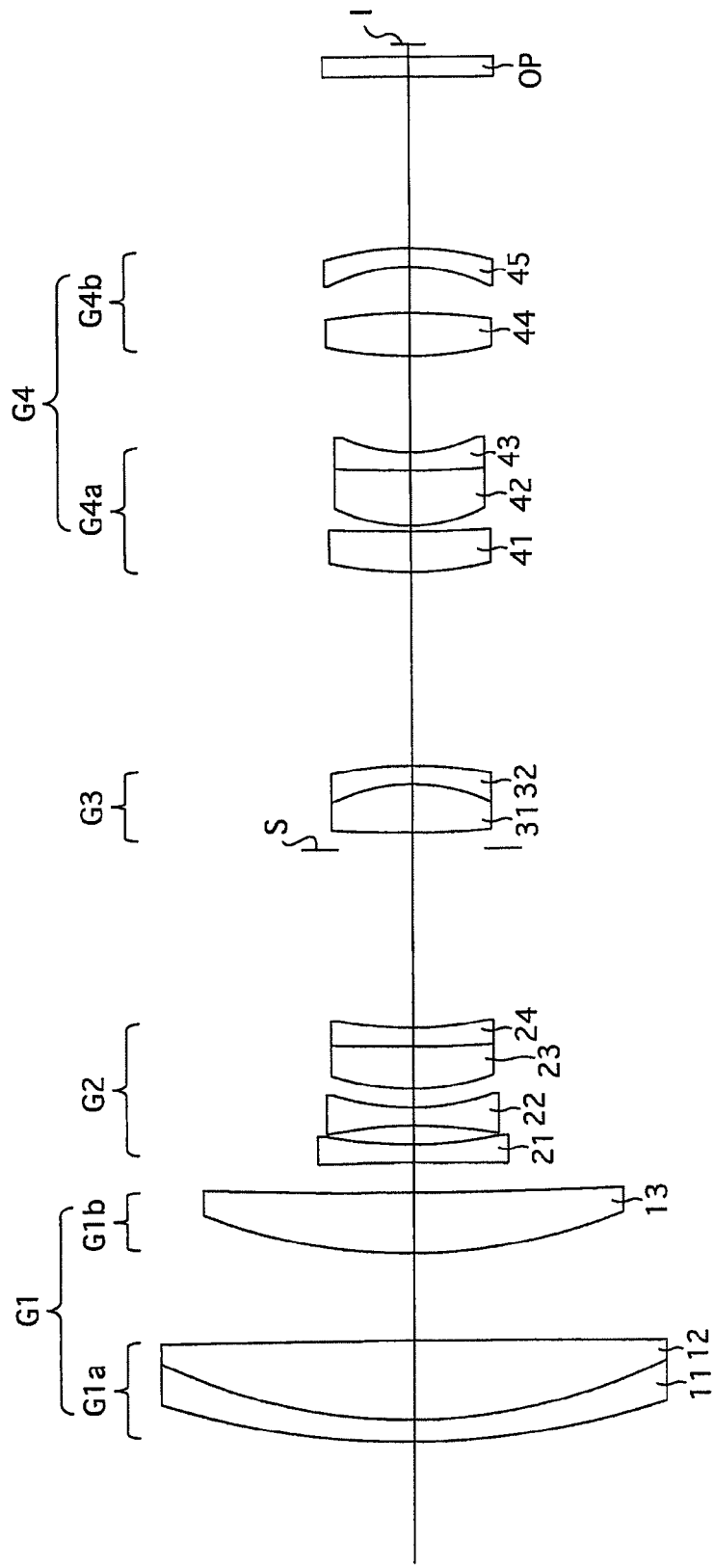

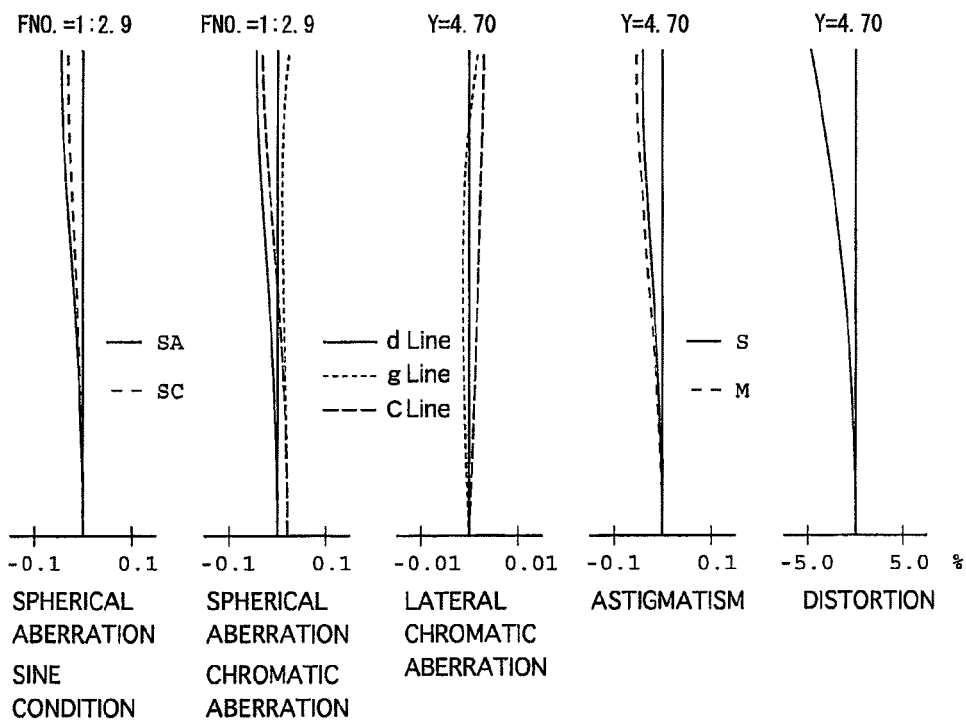
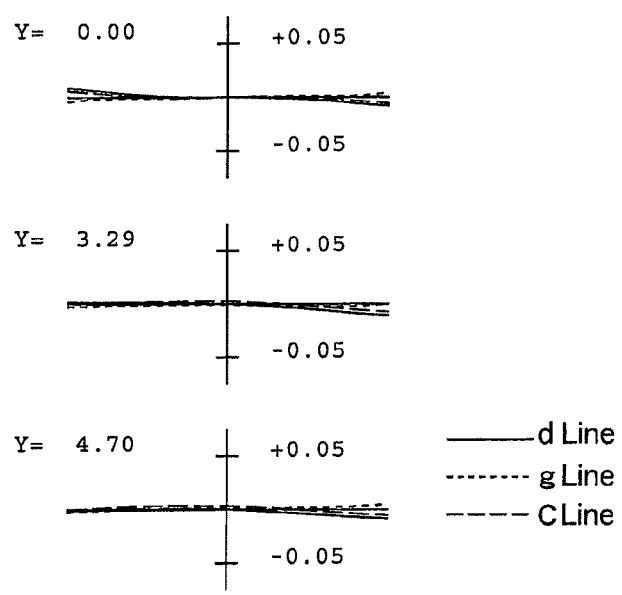

ZOOM LENS SYSTEM AND ELECTRONIC IMAGING APPARATUS USING THE SAME

TECHNICAL FIELD

The present invention relates to a zoom lens system and an electronic imaging apparatus using such a zoom lens system.

BACKGROUND ART

In recent years there has been an increasing demand for zoom lens systems that are provided in electronic imaging apparatuses, such as digital cameras, etc., to be more compact (miniaturized) and to have higher optical performance. Furthermore, there has been a demand to reduce the size (miniaturize) and weight of the focusing lens group to carry out a rapid and quiet focusing operation. Furthermore, there is also an demand to attain a superior optical quality by favorably correcting various aberrations such as axis chromatic aberration and lateral chromatic aberration, etc.

It is typical for a telephoto zoom lens system used in a compact digital camera to have a large f-number at the long focal length extremity due to miniaturization. However, since the aperture is small, the resolving power of the telephoto zoom lens system cannot be improved even if aberrations are favorably corrected due to the influence of diffraction. Accordingly, a zoom lens system in which aberrations are favorably corrected while having a smaller f-number is demanded; and developments have been made for meeting such demands.

For example, Patent Literature Nos. 1 through 3 each disclose a zoom lens system, having four lens groups, configured of a positive first lens group, a negative second lens group, a positive third lens group, and a positive fourth lens group, in that order from the object side, wherein the first lens group is divided into a front sub-lens group and a rear sub-lens group, and the rear sub-lens group of the first lens group serves as a focusing lens group that is moved during focusing.

However, since the zoom lens system of each of Patent Literature Nos. 1 through 3 uses an extremely large number of lens elements in order to achieve a specified optical quality, the miniaturization and reduction in weight of the zoom lens system cannot be said to be sufficient. In particular, since the number or the specific gravity of lens elements that configure the rear sub-lens group (focusing lens group) of the first lens group is large, the miniaturization and reduction in weight of the focusing lens group is insufficient, so that a rapid and quiet focusing operation cannot be carried out. Furthermore, since the Abbe number setting of the lens elements that configure the front sub-lens group and the rear sub-lens group of the first lens group is unsuitable, it becomes difficult to correct various aberrations such as axial chromatic aberration and lateral chromatic aberration, thereby deteriorating the optical quality.

CITATION LIST

Patent Literature

Patent Literature 1: Japanese Unexamined Patent Publication No. H06-51202
Patent Literature 2: Japanese Unexamined Patent Publication No. 2002-162564
Patent Literature 3: Japanese Unexamined Patent Publication No. 2004-85846

SUMMARY OF INVENTION

Technical Problem

The present invention has been devised with consideration to the above problems, and provides a zoom lens system having a miniaturized and reduced-in-weight focusing lens group that can carry out a rapid and quiet focusing operation while achieving a superior optical quality by favorably correcting various aberrations such as axial chromatic aberration and lateral chromatic aberration, and an electronic imaging apparatus using such a zoom lens system.

Solution to Problem

According to an aspect of the present invention, a zoom lens system is provided, including a positive first lens group, a negative second lens group, a positive third lens group, and a positive fourth lens group, in that order from the object side, wherein at least the second lens group and the third lens group are moved during zooming from the short focal length extremity to the long focal length extremity. The first lens group includes a positive first sub-lens group which does not move during a focusing operation, and a positive second sub-lens group, serving as a focusing lens group, which moves during the focusing operation, in that order from the object side. The first sub-lens group is formed from at least one negative lens element, the second sub-lens group is formed from a positive single lens element, and the following conditions (1) and (2) are satisfied:

$$60 < \nu d1b < 75 \tag{1},$$

and $$\nu d1a < 24 \tag{2},$$

wherein $\nu d1b$ designates the Abbe number at the d-line of the positive single lens element of the second sub-lens group, and $\nu d1a$ designates the Abbe number at the d-line of the at least one negative lens element within the first sub-lens group.

It is desirable for the following condition (1') to be satisfied from within the range of condition (1):

$$68 < \nu d1b < 75 \tag{1'}.$$

It is desirable for the following condition (3) to be satisfied:

$$1.0 < SP1b < 1.8 \tag{3},$$

wherein SP1b designates the shape factor of the positive single lens element of the second sub-lens group, SP1b= (R2+R1)/(R2−R1), R1 designates the radius of curvature of the surface on the object side of the positive single lens element of the second sub-lens group, and R2 designates the radius of curvature of the surface on the image side of the positive single lens element of the second sub-lens group.

It is desirable for the following condition (3') to be satisfied from within the range of condition (3):

$$1.15 < SP1b < 1.55 \tag{3'}.$$

In another embodiment, a zoom lens system is provided, including a positive first lens group, a negative second lens group, a positive third lens group, and a positive fourth lens group, in that order from the object side, wherein at least the second lens group and the third lens group are moved during zooming from the short focal length extremity to the long focal length extremity. The first lens group includes a positive first sub-lens group provided with at least one negative lens element, and a positive second sub-lens group formed from a positive single lens element, in that order from the object side, and the following condition (2') is satisfied:

$$vd1a<22.85 \quad (2'),$$

wherein vd1a designates the Abbe number at the d-line of the negative lens element that is positioned closest to the object side within the first sub-lens group.

The second lens group can be configured of a negative lens element having a concave surface on the image side, a negative lens element having a concave surface on the image side, and a cemented lens including a positive lens element and a negative lens element, in that order from the object side. In such a case, it is desirable for each of the positive lens element and the negative lens element, which constitute the cemented lens of the second lens group, to have a convex surface on the object side thereof and a concave surface on the image side thereof.

It is desirable for the zoom lens system of the present invention to satisfy the following conditions (4) and (5):

$$-0.3<f2/ft<-0.18 \quad (4),$$

and $$4.5<TL/ST2<5.5 \quad (5),$$

wherein f2 designates the focal length of the second lens group, ft designates the focal length of the entire lens system at the long focal length extremity, TL designates the entire length of the lens system at the long focal length extremity (the distance between the surface closest to the object side of the first lens group and the imaging plane), and ST2 designates a movement amount of the second lens group during zooming from the short focal length extremity to the long focal length extremity.

In the zoom lens system of the present invention, it is desirable for the fourth lens group to include a third sub-lens group provided with at least one positive lens element and negative lens element, and a fourth sub-lens group provided with at least one positive lens element and negative lens element, in that order from the object side, and wherein the following condition (6) is satisfied:

$$0.15<D4/LD4<0.35 \quad (6),$$

wherein D4 designates an air-distance between the third sub-lens group and the fourth sub-lens group (the distance between the surface closest to the image side of the third sub-lens group to the surface closest to the object side of the fourth sub-lens group), and LD4 designates the distance between a surface closest to the object side of the fourth lens group to a surface closest to the image side thereof.

In the zoom lens system of the present invention, it is desirable for the following condition (7) is satisfied:

$$SG1b<2.8 \quad (7),$$

wherein SG1b designates the specific gravity of the positive single lens element of the second sub-lens group.

An electronic imaging apparatus of the present invention is provided with any of the above-described the zoom lens systems, and an imaging device which converts an image formed by the zoom lens system into electrical signals.

Advantageous Effects of Invention

According to the present invention, a zoom lens system having a miniaturized and reduced-in-weight focusing lens group that can carry out a rapid and quiet focusing operation while achieving a superior optical quality by favorably correcting various aberrations such as axial chromatic aberration and lateral chromatic aberration, and an electronic imaging apparatus using such a zoom lens system, are achieved.

BRIEF DESCRIPTION OF DRAWINGS

FIG. 2 shows various aberrations that occurred in the lens arrangement of FIG. 1.

FIG. 3 shows lateral aberrations that occurred in the lens arrangement of FIG. 1.

FIG. 5 shows various aberrations that occurred in the lens arrangement of FIG. 4.

FIG. 6 shows lateral aberrations that occurred in the lens arrangement of FIG. 4.

FIG. 7 shows a lens arrangement of a second numerical embodiment of a zoom lens system, according to the present invention, at the long focal length extremity when focused on an object at infinity.

FIG. 8 shows various aberrations that occurred in the lens arrangement of FIG. 7.

FIG. 9 shows lateral aberrations that occurred in the lens arrangement of FIG. 7.

DESCRIPTION OF EMBODIMENTS

Figure 37:
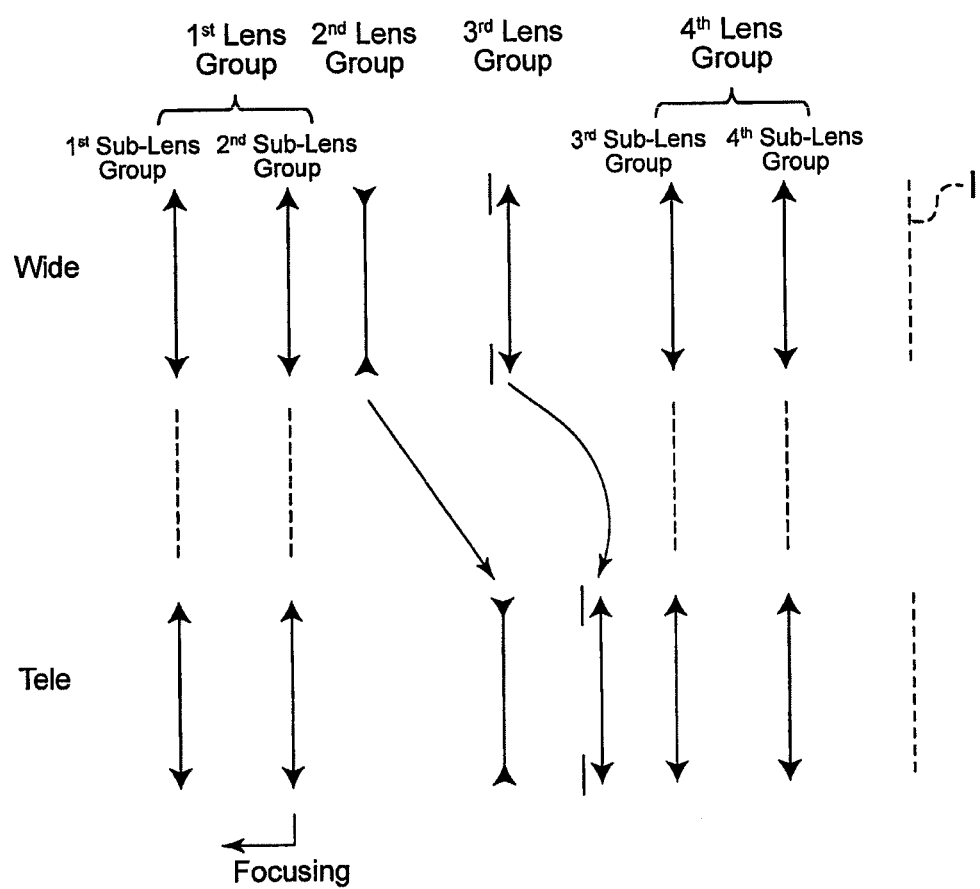
FIG. 37 shows a zoom path of the zoom lens system, according to the present invention.

As shown in the zoom path of FIG. 37, the zoom lens system of the illustrated embodiments is configured of a positive first lens group G1, a negative second lens group G2, a positive third lens group G3, and a positive fourth lens group G4, in that order from the object side. The first lens group G1 is configured of a positive first sub-lens group G1a and a positive second sub-lens group G1b, in that order from the object side. The fourth lens group G4 is configured of a positive third sub-lens group G4a and a positive fourth sub-lens group G4b, in that order from the object side. A diaphragm S, which is positioned between the second lens group G2 and the third lens group G3 moves integrally with the third lens group G3. 'I' designates the imaging plane.

In this zoom lens system, upon zooming from the short focal length extremity (Wide) to the long focal length extremity (Tele), the distance between the first lens group G1 and the second lens group G2 increases, the distance between the second lens group G2 and the third lens group G3 decreases, and the distance between the third lens group G3 and the fourth lens group G4 decreases. Upon zooming from the short focal length extremity to the long focal length extremity, the distance between the first sub-lens group G1a and the second sub-lens group G1b does not change, and the distance between the third sub-lens group G4a and the fourth sub-lens group G4b does not change.

In the illustrated embodiments, upon zooming from the short focal length extremity to the long focal length extremity, the first lens group G1 (the first sub-lens group G1a and the second sub-lens group G1b) and the fourth lens group G4 (the third sub-lens group G4a and the fourth sub-lens group G4b) remain stationary relative to the image plane I (do not move in the optical axis direction). However, an embodiment is also possible in which the first lens group G1 (the first sub-lens group G1a and the second sub-lens group G1b) and the fourth lens group G4 (the third sub-lens group G4a and the fourth sub-lens group G4b) move in the optical axis direction upon zooming from the short focal length extremity to the long focal length extremity.

The second lens group G2 monotonically moves toward the image side upon zooming from the short focal length extremity to the long focal length extremity.

An embodiment in which, upon zooming from the short focal length extremity to the long focal length extremity, the third lens group G3 first moves toward the image side and thereafter moves by a slight amount toward the object side (resulting in movement toward the image side relative to the short focal length extremity), and an embodiment in which the third lens group G3 monotonically moves toward the image side, are possible.

The first sub-lens group G1a does not move during focusing, and the second sub-lens group G1b is a focusing lens group which moves during focusing. The second sub-lens group G1b moves toward the object side upon focusing on an object from infinity to an object at a finite distance.

In each of the first through sixth numerical embodiments, the first sub-lens group G1a of the first lens group G1 is configured of a cemented lens having a negative lens element 11 and a positive lens element 12, in that order from the object side. The negative lens element 11 is formed from a high dispersion glass material (e.g., OHARA S-NPH1 of Ohara Inc.) having an Abbe number of 22.8 at the d-line.

In each of the first through sixth numerical embodiments, the second sub-lens group G1b of the first lens group G1 is configured of a positive single lens element 13. The positive single lens element 13 is formed from a glass material (e.g., OHARA S-FSL5 of Ohara Inc.) having anomalous dispersion characteristics such that the Abbe number thereof is 70.2 at the d-line, and having a low specific gravity of 2.46.

In each of the first through sixth numerical embodiments, the second lens group G2 is configured of a negative lens element (negative lens element having a concave surface on the image side) 21, a negative lens element (negative lens element having a concave surface on the image side) 22, and a cemented lens configured of a positive lens element 23 and a negative lens element 24, in that order from the object side.

In each of the first through sixth numerical embodiments, the third lens group G3 is configured of a cemented lens configured of a positive lens element 31 and a negative lens element 32, in that order from the object side.

In each of the first through sixth numerical embodiments, the third sub-lens group G4a of the fourth lens group G4 is configured of a positive lens element 41, and a cemented lens configured of a positive lens element 42 and a negative lens element 43, in that order from the object side. In each of the first through sixth numerical embodiments, the fourth sub-lens group G4b of the fourth lens group G4 is configured of a positive lens element 44 and a negative lens element 45, in that order from the object side.

In each zoom lens system of the illustrated embodiments, the first lens group G1 and the fourth lens group G4 are stationary relative to the image plane I during zooming from the short focal length extremity to the long focal length extremity, while mainly the second lens group G2 performs zooming and the third lens group G3 compensates for image-surface fluctuations that occur during zooming. Furthermore, the first lens group G1 is divided into the first sub-lens group G1a and the second sub-lens group G1b; the first sub-lens group G1a is configured to be immovable during focusing, and the second sub-lens group G1b is configured as a focusing lens group that moves during focusing. Accordingly, the overall length of the lens system does not change during zooming and focusing, so that a zoom lens system, in which the f-number variation is small, can be achieved.

In each zoom lens system of the illustrated embodiments, by configuring the second lens group G2 with a negative lens element (negative lens element having a concave surface on the image side) 21, a negative lens element (negative lens element having a concave surface on the image side) 22, and a cemented lens configured of a positive lens element 23 and a negative lens element 24, in that order from the object side, coma and astigmatism can be favorably corrected over the entire zooming range so that a superior optical quality can be achieved. Furthermore, by providing a concave surface facing the image side on each of the positive lens element 23 and the negative lens element 24, which constitute a cemented lens, coma and astigmatism can be corrected even more favorably.

In each zoom lens system of the illustrated embodiments, the fourth lens group G4 is configured of the positive third sub-lens group G4a and the positive fourth sub-lens group G4b, in that order from the object side. The third sub-lens group G4a is configured of two positive lens elements 41 and 42, and one negative lens element 43. The fourth sub-lens group G4b is configured of one positive lens element 44 and one negative lens element 45. By configuring the fourth lens group G4 in the above manner, a minimal lens arrangement for favorably correcting spherical aberration, coma, field curvature and astigmatism can be obtained, while achieving miniaturization and reduction in weight of the lens system.

Furthermore, in each zoom lens system of the illustrated embodiments, by forming the second sub-lens group G1b (constituting a focusing lens group) as the positive single lens element 13, appropriately setting the Abbe number at the d-line of the positive single lens element 13 and, in addition, by appropriately setting the Abbe number at the d-line of the negative lens element 11 provided within the first sub-lens group G1a, the focusing lens group can be miniaturized and reduced in weight to carry out a rapid and quiet focusing operation while successfully achieving a superior optical quality by favorably correcting various aberrations such as axial chromatic aberration and lateral chromatic aberration.

Condition (1) specifies the Abbe number at the d-line of the positive single lens element 13 of the second sub-lens group G1b. By satisfying condition (1), the focusing lens group can be miniaturized and reduced in weight to carry out a rapid and quiet focusing operation while achieving a superior optical quality by favorably correcting various aberrations such as axial chromatic aberration and lateral chromatic aberration, particularly at the long focal length extremity.

If the upper limit of condition (1) is exceeded, although advantageous for correction of chromatic aberration, since only a glass material having a large specific gravity would be present, the specific gravity of the glass material forming the positive single lens element 13 becomes excessively large (would be unavoidably large), so that it becomes difficult to achieve a rapid and quiet focusing operation due to an increase in size and an increase in weight of the focusing lens group.

If the lower limit of condition (1) is exceeded, it becomes difficult to correct various aberrations such as axial chromatic aberration and lateral chromatic aberration, particularly at the long focal length extremity, so that the optical quality deteriorates.

As described above, in each of the first through sixth numerical embodiments, the first sub-lens group G1a is configured of a cemented lens having a negative lens element 11 and a positive lens element 12, in that order from the object side. However, two or more negative lens elements can be included in the first sub-lens group G1a by adding a negative lens element(s) to the first sub-lens group G1a.

With this configuration, condition (2) and condition (2') specify the Abbe number at the d-line of the negative lens element 11 which is provided in the first sub-lens group G1a. By satisfying condition (2) and condition (2'), various aberrations such as axial chromatic aberration and lateral chromatic aberration, particularly at the long focal length extremity, can be favorably corrected, thereby achieving a superior optical quality.

If the upper limit of condition (2) and condition (2') is exceeded, it becomes difficult to correct various aberrations such as axial chromatic aberration and lateral chromatic aberration, particularly at the long focal length extremity, so that the optical quality deteriorates.

Condition (3) specifies the specific profile (shape factor) of the positive single lens element 13 of the second sub-lens group G1b. By satisfying condition (3), various aberrations such as astigmatism can be favorably corrected, thereby achieving a superior optical quality.

If the upper limit of condition (3) is exceeded, the curvature of the positive single lens element 13 of the second sub-lens group G1b becomes too large, resulting in high-order aberrations occurring, thereby deteriorating the optical quality.

If the lower limit of condition (3) is exceeded, astigmatism easily occurs, thereby deteriorating the optical quality.

Condition (4) specifies the ratio of the focal length of the second lens group G2 to the focal length of the entire lens system at the long focal length extremity. By satisfying condition (4), fluctuation in aberrations during zooming can be suppressed so that a superior optical quality can be obtained, and the movement amount of the second lens group G2 is decreased during zooming to thereby miniaturize the lens system.

If the upper limit of condition (4) is exceeded, aberration fluctuations during zooming increase due to the power of the second lens group G2 becoming excessively strong, thereby deteriorating the optical quality.

If the lower limit of condition (4) is exceeded, the movement amount of the second lens group G2 during zooming increases due to the power of the second lens group G2 becoming too weak, thereby enlarging the size of the lens system.

Condition (5) specifies the ratio of the entire length of the lens system (the distance between the surface closest to the object side of the first lens group G1 and the imaging plane I) at the long focal length extremity to the movement amount of the second lens group G2 when zooming from the short focal length extremity to the long focal length extremity. By satisfying condition (5), the lens system is miniaturized by reducing the movement amount of the second lens group G2 during zooming, and deterioration in optical quality caused by manufacturing error can be prevented.

If the upper limit of condition (5) is exceeded, the movement amount of the second lens group G2 during zooming becomes too small, so that the error sensitivity increases, thereby making it easier for deterioration of the optical quality due to manufacturing error to occur.

If the lower limit of condition (5) is exceeded, the movement amount of the second lens group G2 during zooming becomes too large, thereby enlarging the size of the lens system.

Condition (6) specifies the ratio of the air-distance between the third sub-lens group G4a and the fourth sub-lens group G4b (the distance between the surface closest to the image side of the third sub-lens group G4a to the surface closest to the object side of the fourth sub-lens group G4b) to the distance between the surface closest to the object side of the fourth lens group G4 to the surface closest to the image side thereof. By satisfying condition (6), spherical aberration, coma and field curvature can be favorably corrected to achieve a superior optical quality.

If the upper limit of condition (6) is exceeded, it becomes difficult to correct spherical aberration and coma, thereby deteriorating the optical quality.

If the lower limit of condition (6) is exceeded, the overlapping of light rays at any angle-of-view increases, making it difficult to correct field curvature, so that the optical quality deteriorates.

Condition (7) specifies the specific gravity of the positive single lens element 13 of the second sub-lens group G1b. By selecting a glass material having a low specific gravity that satisfies condition (7) for use as the positive single lens element 13, constituting the focusing lens group, the focusing lens group can be miniaturized and reduced in weight, so that a rapid and quiet focusing operation can be carried out.

If the upper limit of condition (7) is exceeded, it becomes difficult to achieve a rapid and quiet focusing operation due to the focusing lens group increasing in size and increasing in weight. In order to forcibly carry out a rapid and quiet focusing operation in a state in which the upper limit of condition (7) is exceeded, a more powerful focusing drive system must be used, so that an increase in size and weight of the entire optical unit, including the lens system, cannot be avoided.

Specific first through sixth numerical embodiments will be herein discussed. In the various aberration diagrams, lateral aberration diagrams and the tables, the d-line, the g-line and the C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν (d) designates the Abbe number with respect to the d-line. The unit used for the various lengths is defined in millimeters (mm). None of the first through sixth numerical embodiments utilize an aspherical lens element.

[Embodiment 1]

Figure 1:
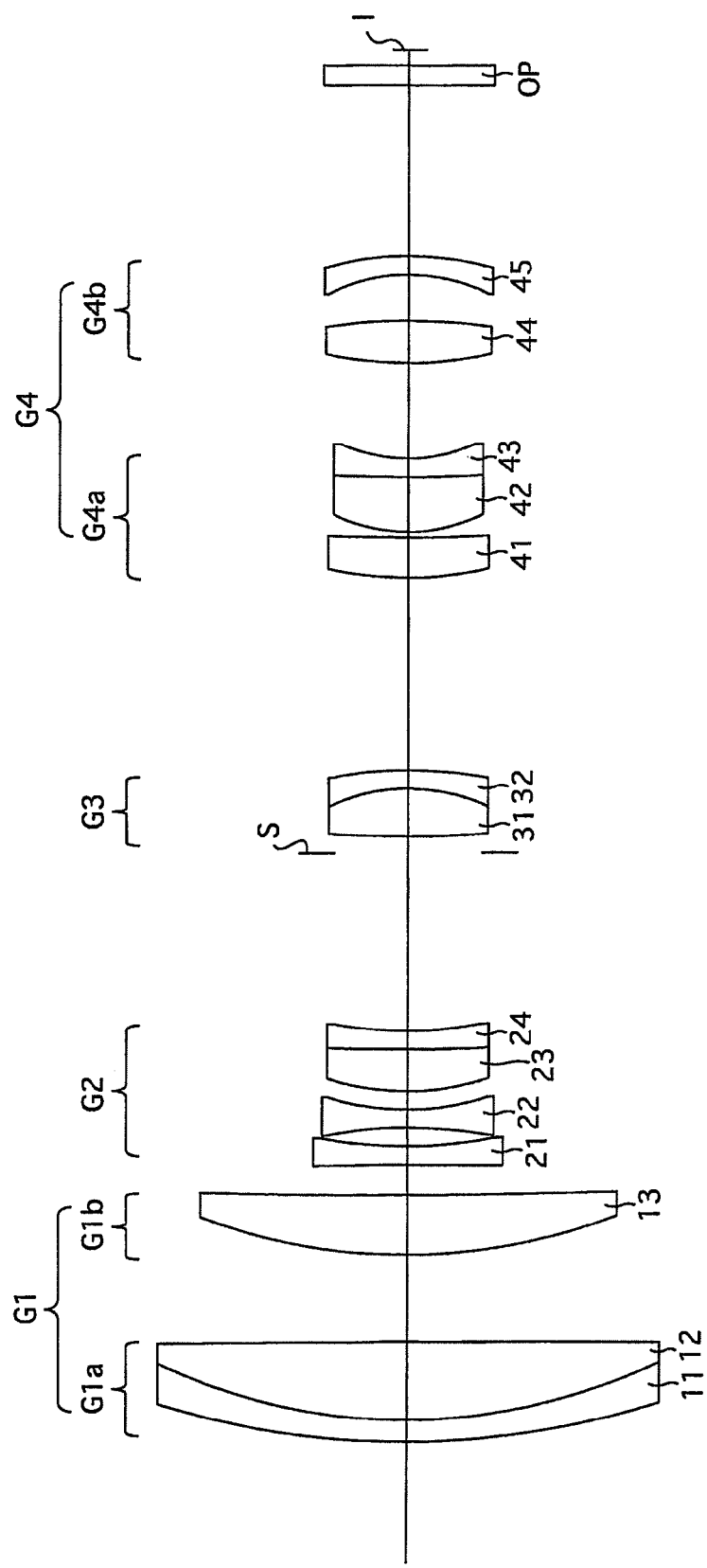
FIG. 1 shows a lens arrangement of a first numerical embodiment of a zoom lens system, according to the present invention, at the long focal length extremity when focused on an object at infinity.
Figure 4:
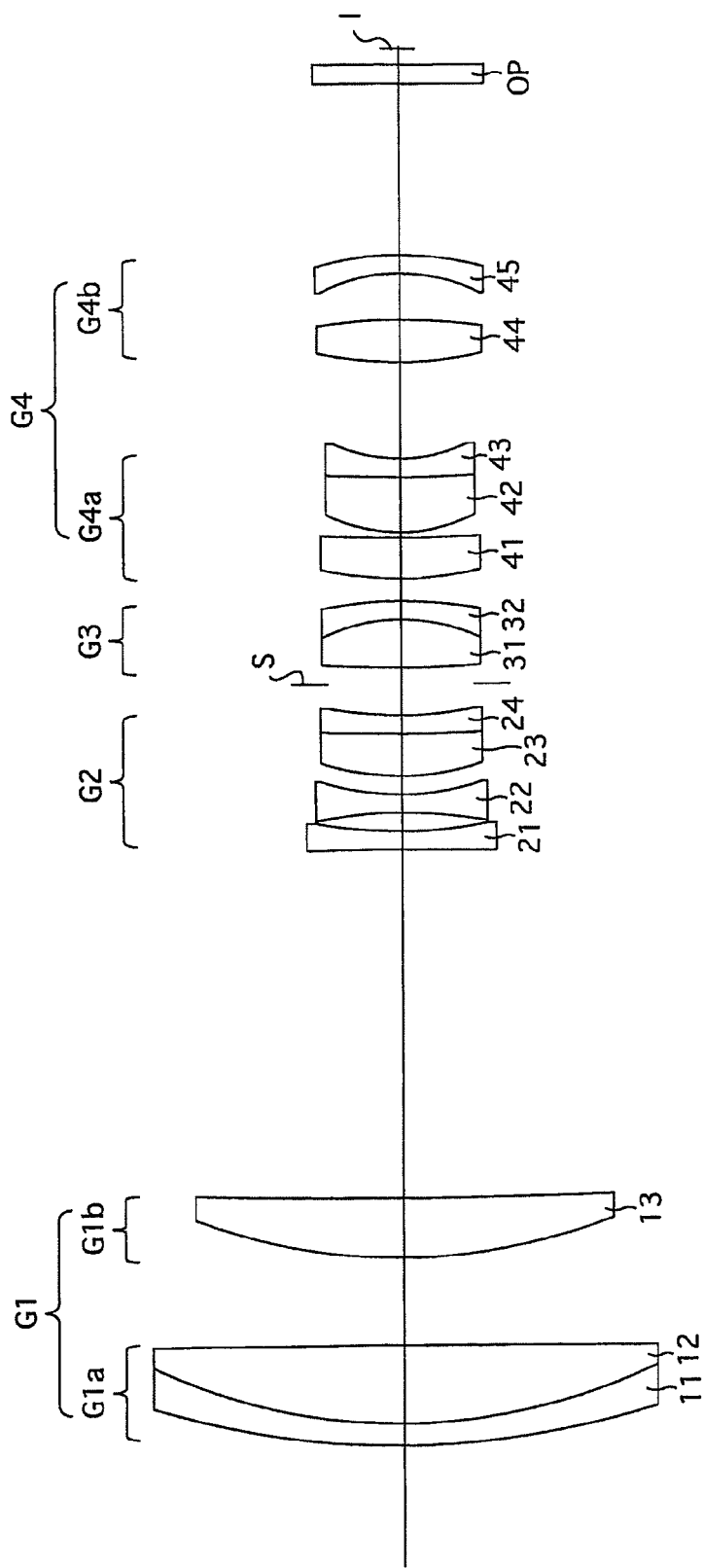
FIG. 4 shows a lens arrangement of the first numerical embodiment of a zoom lens system at the short focal length extremity when focused on an object at infinity.

FIGS. 1 through 6 and Tables 1 through 3 show a first numerical embodiment of the zoom lens system according to the present invention. FIG. 1 shows a lens arrangement at the long focal length extremity when focusing on an object at infinity, FIG. 2 shows the various aberrations thereof, FIG. 3 shows the lateral aberrations thereof, FIG. 4 shows a lens arrangement at the short focal length extremity when focusing on an object at infinity, FIG. 5 shows the various aberrations thereof, and FIG. 6 shows the lateral aberrations thereof. Table 1 shows the lens surface data, Table 2 shows various lens-system data, and Table 3 shows the lens group data.

The zoom lens system of the first numerical embodiment is configured of a positive first lens group G1, a negative second lens group G2, a positive third lens group G3, and a positive fourth lens group G4, in that order from the object side. A diaphragm S which is positioned between the second lens group G2 and the third lens group G3 moves integrally with the third lens group G3. An optical filter OP is provided between the fourth lens group G4 and the imaging plane I.

The first lens group G1 is configured of a positive first sub-lens group G1a, which does not move during focusing, and a positive second sub-lens group G1b, constituting a focusing lens group which moves during a focusing operation, in that order from the object side. Upon focusing on an object at infinity to an object at a finite distance, the second sub-lens group G1b is moved toward the object side.

The first sub-lens group G1a is configured of a cemented lens configured of a negative meniscus lens element 11 having a convex surface on the object side, and a biconvex positive lens element 12, in that order from the object side. The negative meniscus lens element 11 is formed from a high dispersion glass (e.g., OHARA S-NPH1 of Ohara Inc.) having an Abbe number of 22.8 at the d-line.

The second sub-lens group G1b is configured of a positive meniscus single lens element 13 having a convex surface on the object side. The positive meniscus single lens element 13 is formed from a glass material (e.g., OHARA S-FSL5 of Ohara Inc.) having anomalous dispersion characteristics such that the Abbe number thereof is 70.2 at the d-line, and a low specific gravity of 2.46.

The second lens group G2 is configured of a biconcave negative lens element (a negative lens element having a concave surface on the image side) 21, a biconcave negative lens element (a negative lens element having a concave surface on the image side) 22, and a cemented lens configured of a positive meniscus lens element 23 having a convex surface on the object side and a negative meniscus lens element 24 having a convex surface on the object side, in that order from the object side.

The third lens group G3 is configured of a cemented lens configured of a biconvex positive lens element 31 and a negative meniscus lens element 32 having a convex surface on the image side, in that order from the object side.

The fourth lens group G4 is configured of a positive third sub-lens group G4a and a positive fourth sub-lens group G4b, in that order from the object side. The third sub-lens group G4a is configured of a positive meniscus lens element 41 having a convex surface on the object side, and a cemented lens configured of a positive meniscus lens element 42 having a convex surface on the object side and a negative meniscus lens element 43 having a convex surface on the object side, in that order from the object side. The fourth sub-lens group G4b is configured of a biconvex positive lens element 44 and a negative meniscus lens element 45 having a convex surface on the image side, in that order from the object side. Furthermore, in the illustrated embodiment, the positive third sub-lens group G4a and the positive fourth sub-lens group G4b are separated from each other within the fourth lens group G4 at a position where the air-distance therebetween is greatest.

TABLE 1

SURFACE DATA

| Surf. No. | R | d | N(d) | ν(d) |
|---|---|---|---|---|
| 1 | 45.554 | 1.20 | 1.80810 | 22.8 |
| 2 | 31.451 | 4.30 | 1.49700 | 81.6 |
| 3 | −2061.947 | 4.80 | | |
| 4 | 31.427 | 3.30 | 1.48749 | 70.2 |
| 5 | 390.000 | d5 | | |
| 6 | −273.977 | 1.00 | 1.72916 | 54.7 |
| 7 | 25.016 | 1.00 | | |
| 8 | −24.825 | 1.00 | 1.72916 | 54.7 |
| 9 | 14.042 | 1.00 | | |
| 10 | 13.805 | 2.30 | 1.84666 | 23.8 |
| 11 | 106.188 | 1.00 | 1.77250 | 49.6 |
| 12 | 20.854 | d12 | | |
| 13(Diaphragm) | ∞ | 0.90 | | |
| 14 | 60.940 | 2.60 | 1.69680 | 55.5 |
| 15 | −10.246 | 1.00 | 1.85026 | 32.3 |
| 16 | −23.254 | d16 | | |
| 17 | 19.427 | 2.20 | 1.69680 | 55.5 |
| 18 | 85.000 | 0.30 | | |
| 19 | 9.058 | 3.00 | 1.49700 | 81.6 |
| 20 | 74.966 | 1.00 | 1.72342 | 38.0 |
| 21 | 8.918 | 5.20 | | |
| 22 | 20.735 | 2.30 | 1.60300 | 65.5 |
| 23 | −31.228 | 2.50 | | |
| 24 | −9.860 | 1.00 | 1.56732 | 42.8 |
| 25 | −16.841 | 9.28 | | |
| 26 | ∞ | 1.05 | 1.51633 | 64.1 |
| 27 | ∞ | — | | |

TABLE 2

VARIOUS LENS SYSTEM DATA
Zoom Ratio: 2.84

| | Short Focal Length Extremity | Intermediate Focal Length | Long Focal Length Extremity |
|---|---|---|---|
| FNO. | 2.9 | 2.9 | 2.9 |
| f | 15.50 | 21.49 | 44.04 |
| W | 17.6 | 12.5 | 6.0 |
| Y | 4.70 | 4.70 | 4.70 |
| fB | 0.56 | 0.55 | 0.53 |
| L | 75.58 | 75.57 | 75.55 |
| d5 | 1.65 | 9.04 | 18.89 |
| d12 | 9.67 | 8.00 | 1.69 |
| d16 | 10.48 | 4.76 | 1.22 |

TABLE 3

LENS GROUP DATA

| Lens Group | 1st Surf. | Focal Length |
|---|---|---|
| 1 | 1 | 46.59 |
| 2 | 6 | −10.78 |
| 3 | 14 | 30.57 |
| 4 | 17 | 24.72 |

[Numerical Embodiment 2]

Figure 10:
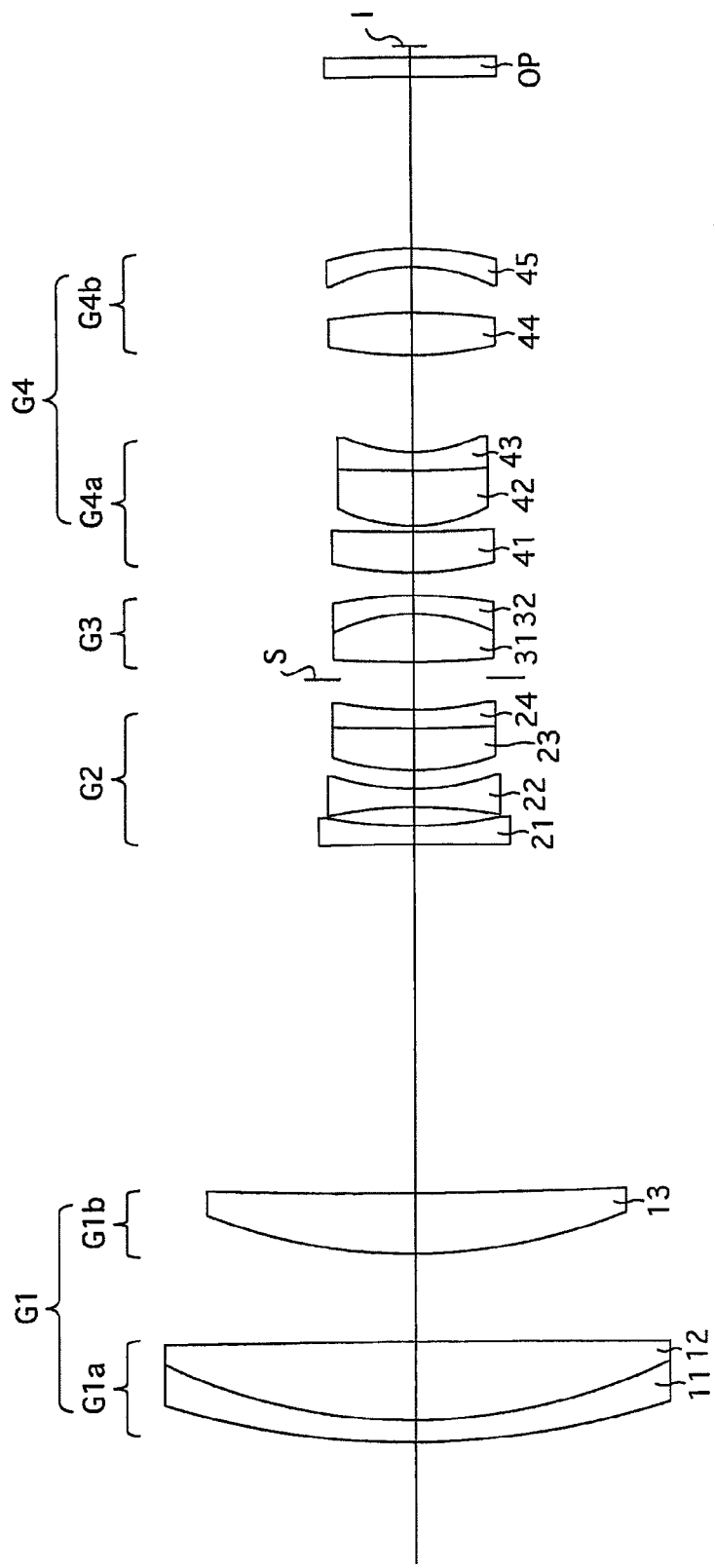
FIG. 10 shows a lens arrangement of the second numerical embodiment of a zoom lens system at the short focal length extremity when focused on an object at infinity.
Figure 11:
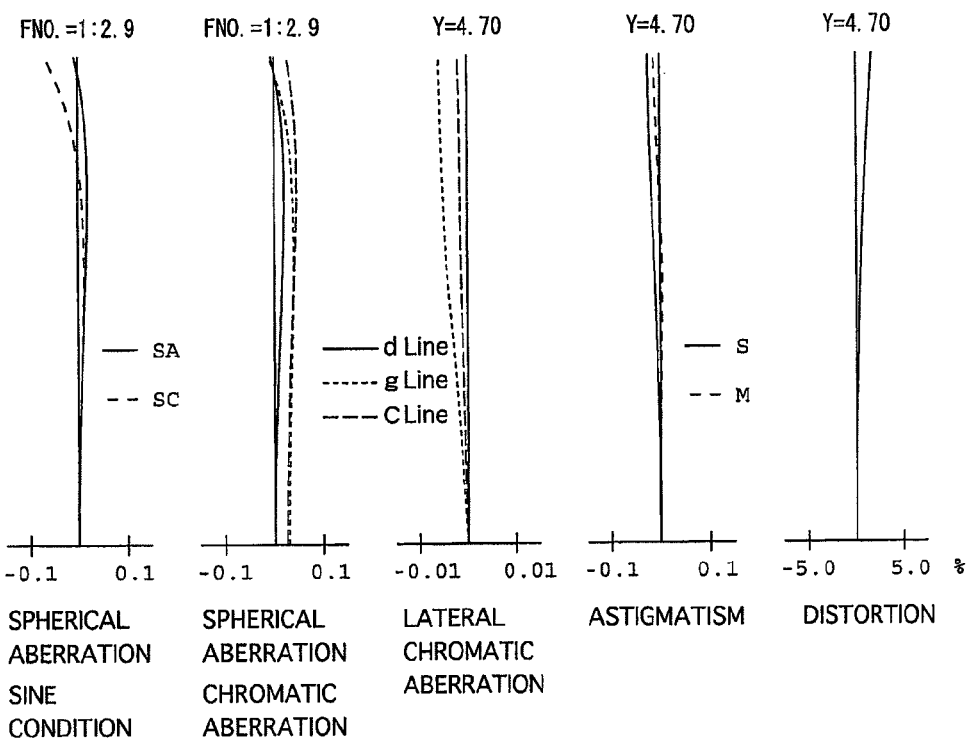
FIG. 11 shows various aberrations that occurred in the lens arrangement of FIG. 10.
Figure 12:
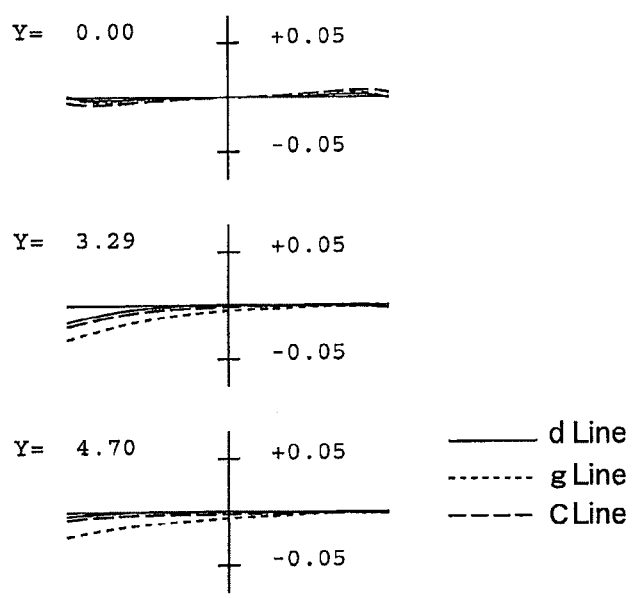
FIG. 12 shows lateral aberrations that occurred in the lens arrangement of FIG. 10.

FIGS. 7 through 12 and Tables 4 through 6 show a second numerical embodiment of the zoom lens system according to the present invention. FIG. 7 shows a lens arrangement at the long focal length extremity when focusing on an object at infinity, FIG. 8 shows the various aberrations thereof, FIG. 9 shows the lateral aberrations thereof, FIG. 10 shows a lens arrangement at the short focal length extremity when focusing on an object at infinity, FIG. 11 shows the various aberrations thereof, and FIG. 12 shows the lateral aberrations thereof. Table 4 shows the lens surface data, Table 5 shows various lens-system data, and Table 6 shows the lens group data.

The lens arrangement of the second numerical embodiment is the same as that of the first numerical embodiment.

TABLE 4

SURFACE DATA

| Surf. No. | R | d | N(d) | ν(d) |
|---|---|---|---|---|
| 1 | 45.470 | 1.20 | 1.80810 | 22.8 |
| 2 | 31.462 | 4.30 | 1.49700 | 81.6 |
| 3 | −1288.781 | 4.80 | | |
| 4 | 31.049 | 3.30 | 1.48749 | 70.2 |
| 5 | 300.000 | d5 | | |
| 6 | −271.357 | 1.00 | 1.72916 | 54.7 |
| 7 | 24.869 | 1.00 | | |
| 8 | −24.895 | 1.00 | 1.72916 | 54.7 |
| 9 | 14.025 | 1.00 | | |
| 10 | 13.811 | 2.30 | 1.84666 | 23.8 |
| 11 | 106.194 | 1.00 | 1.77250 | 49.6 |
| 12 | 20.845 | d12 | | |
| 13(Diaphragm) | ∞ | 0.90 | | |
| 14 | 61.019 | 2.60 | 1.69680 | 55.5 |
| 15 | −10.237 | 1.00 | 1.85026 | 32.3 |
| 16 | −23.289 | d16 | | |
| 17 | 19.488 | 2.20 | 1.69680 | 55.5 |
| 18 | 90.000 | 0.30 | | |
| 19 | 9.058 | 3.00 | 1.49700 | 81.6 |
| 20 | 77.335 | 1.00 | 1.72342 | 38.0 |
| 21 | 8.914 | 5.20 | | |
| 22 | 20.839 | 2.30 | 1.60300 | 65.5 |
| 23 | −31.652 | 2.50 | | |
| 24 | −9.926 | 1.00 | 1.56732 | 42.8 |
| 25 | −16.919 | 9.28 | | |
| 26 | ∞ | 1.05 | 1.51633 | 64.1 |
| 27 | ∞ | — | | |

TABLE 5

VARIOUS LENS SYSTEM DATA
Zoom Ratio: 2.86

| | Short Focal Length Extremity | Intermediate Focal Length | Long Focal Length Extremity |
|---|---|---|---|
| FNO. | 2.9 | 2.9 | 2.9 |
| f | 15.51 | 21.53 | 44.28 |
| W | 17.6 | 12.5 | 6.0 |
| Y | 4.70 | 4.70 | 4.70 |
| fB | 0.56 | 0.55 | 0.52 |
| L | 75.58 | 75.57 | 75.54 |
| d5 | 1.65 | 9.04 | 18.89 |
| d12 | 9.66 | 8.00 | 1.67 |
| d16 | 10.48 | 4.76 | 1.24 |

TABLE 6

LENS GROUP DATA

| Lens Group | 1st Surf. | Focal Length |
|---|---|---|
| 1 | 1 | 46.56 |
| 2 | 6 | −10.75 |
| 3 | 14 | 30.65 |
| 4 | 17 | 24.66 |

[Numerical Embodiment 3]

Figure 13:
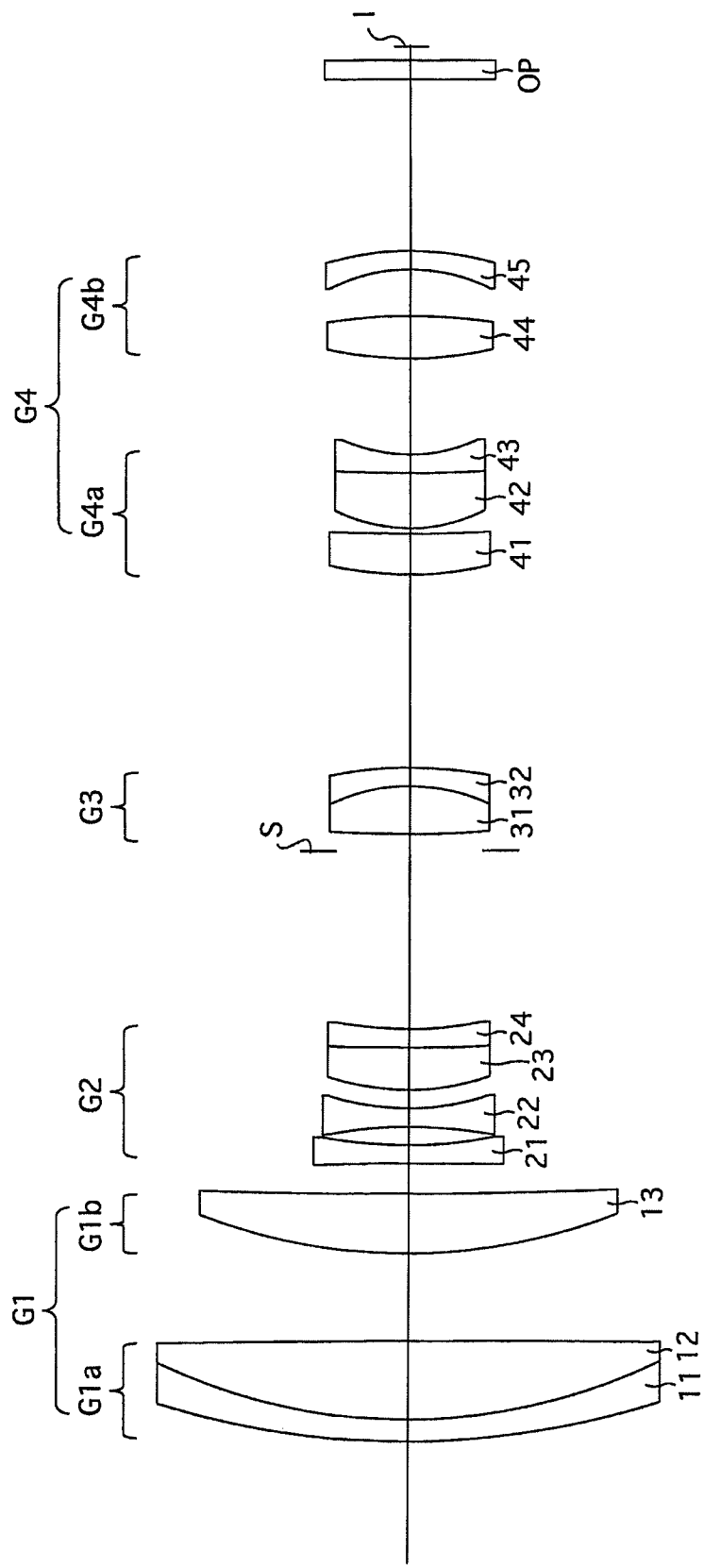
FIG. 13 shows a lens arrangement of a third numerical embodiment of a zoom lens system, according to the present invention, at the long focal length extremity when focused on an object at infinity.
Figure 14:
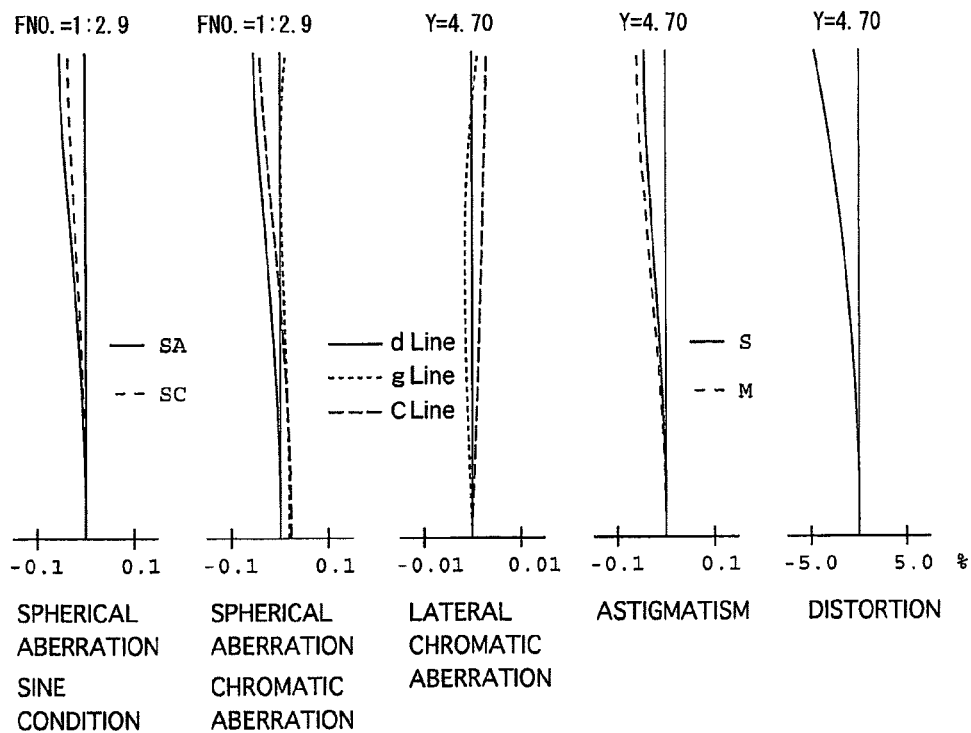
FIG. 14 shows various aberrations that occurred in the lens arrangement of FIG. 13.
Figure 15:
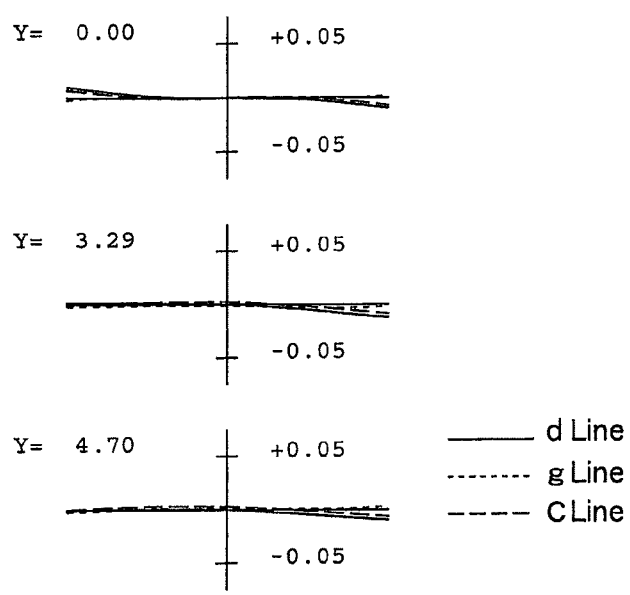
FIG. 15 shows lateral aberrations that occurred in the lens arrangement of FIG. 13.
Figure 16:
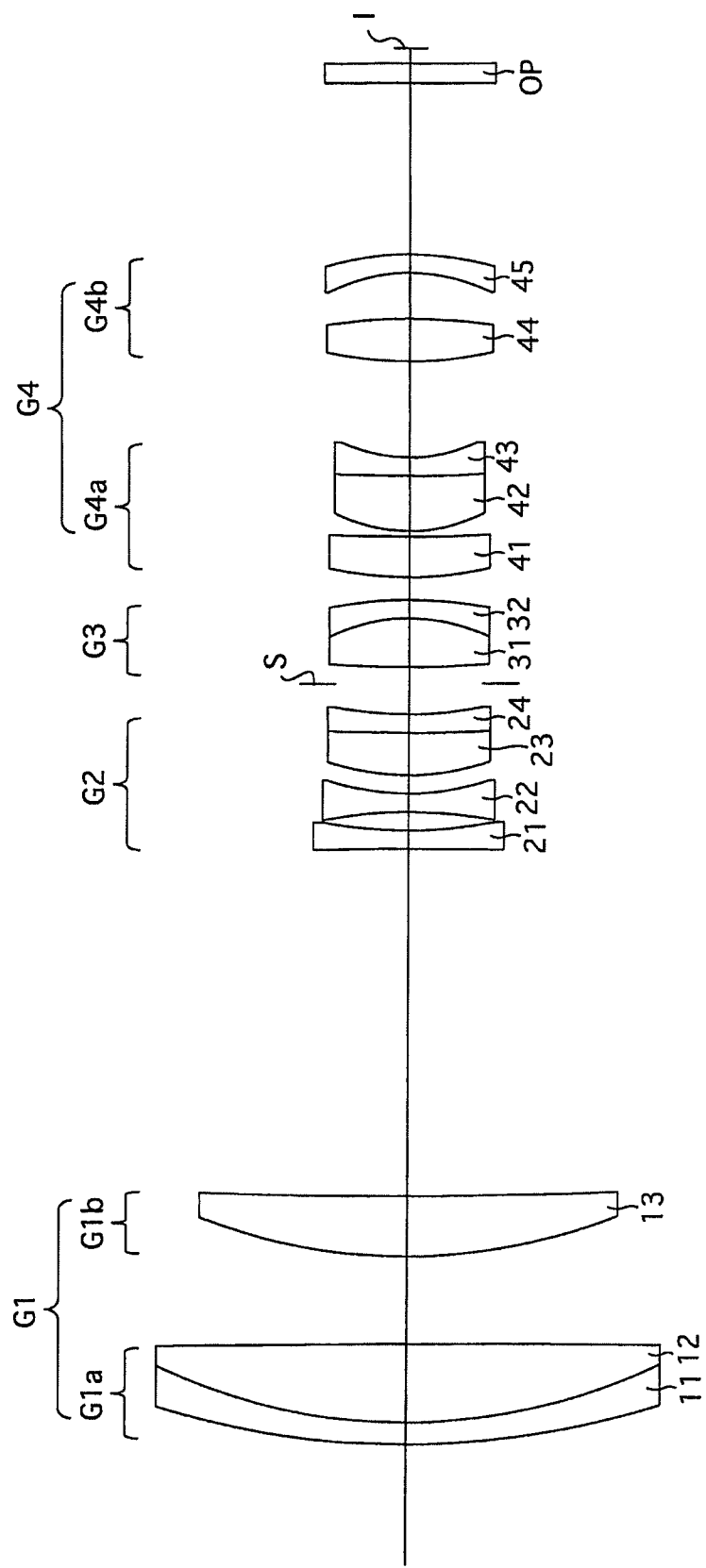
FIG. 16 shows a lens arrangement of the third numerical embodiment of a zoom lens system at the short focal length extremity when focused on an object at infinity.
Figure 17:
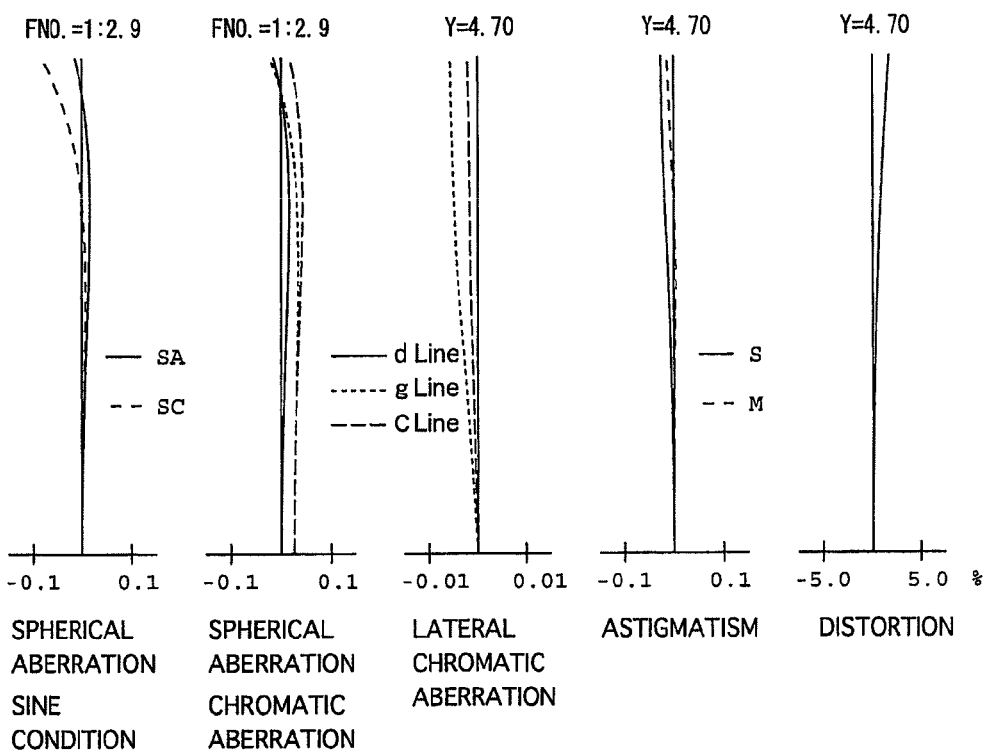
FIG. 17 shows various aberrations that occurred in the lens arrangement of FIG. 16.
Figure 18:
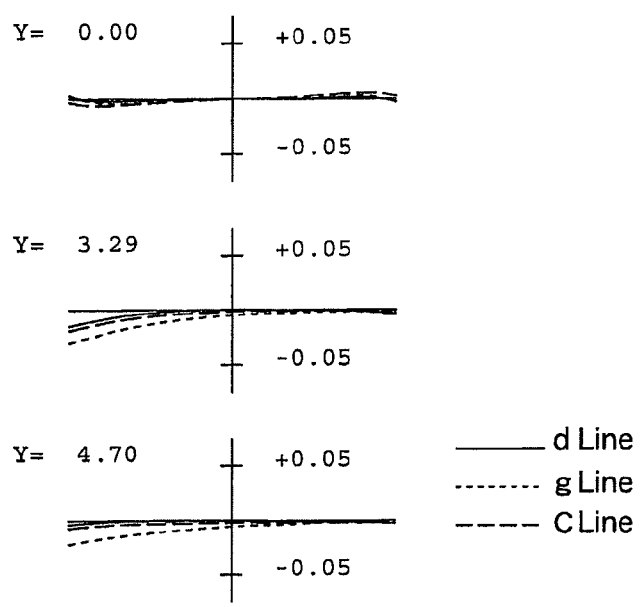
FIG. 18 shows lateral aberrations that occurred in the lens arrangement of FIG. 16.

FIGS. 13 through 18 and Tables 7 through 9 show a third numerical embodiment of the zoom lens system according to the present invention. FIG. 13 shows a lens arrangement at the long focal length extremity when focusing on an object at infinity, FIG. 14 shows the various aberrations thereof, FIG. 15 shows the lateral aberrations thereof, FIG. 16 shows a lens arrangement at the short focal length extremity when focusing on an object at infinity, FIG. 17 shows the various aberrations thereof, and FIG. 18 shows the lateral aberrations thereof. Table 7 shows the lens surface data, Table 8 shows various lens-system data, and Table 9 shows the lens group data.

The lens arrangement of the third numerical embodiment is the same as that of the first numerical embodiment.

TABLE 7

SURFACE DATA

| Surf. No. | R | d | N(d) | ν(d) |
|---|---|---|---|---|
| 1 | 45.454 | 1.20 | 1.80810 | 22.8 |
| 2 | 31.513 | 4.30 | 1.49700 | 81.6 |
| 3 | −1136.453 | 4.80 | | |
| 4 | 31.062 | 3.30 | 1.48749 | 70.2 |
| 5 | 290.000 | d5 | | |
| 6 | −268.049 | 1.00 | 1.72916 | 54.7 |
| 7 | 24.813 | 1.00 | | |
| 8 | −24.908 | 1.00 | 1.72916 | 54.7 |
| 9 | 14.015 | 1.00 | | |
| 10 | 13.803 | 2.30 | 1.84666 | 23.8 |
| 11 | 102.117 | 1.00 | 1.77250 | 49.6 |
| 12 | 20.825 | d12 | | |
| 13(Diaphragm) | ∞ | 0.90 | | |
| 14 | 60.625 | 2.60 | 1.69680 | 55.5 |
| 15 | −10.254 | 1.00 | 1.85026 | 32.3 |
| 16 | −23.233 | d16 | | |
| 17 | 19.445 | 2.20 | 1.69680 | 55.5 |
| 18 | 85.000 | 0.30 | | |
| 19 | 9.052 | 3.00 | 1.49700 | 81.6 |
| 20 | 75.329 | 1.00 | 1.72342 | 38.0 |
| 21 | 8.916 | 5.20 | | |
| 22 | 20.759 | 2.30 | 1.60300 | 65.5 |
| 23 | −31.716 | 2.50 | | |
| 24 | −9.887 | 1.00 | 1.56732 | 42.8 |
| 25 | −16.626 | 9.28 | | |
| 26 | ∞ | 1.05 | 1.51633 | 64.1 |
| 27 | ∞ | — | | |

TABLE 8

VARIOUS LENS SYSTEM DATA
Zoom Ratio: 2.86

| | Short Focal Length Extremity | Intermediate Focal Length | Long Focal Length Extremity |
|---|---|---|---|
| FNO. | 2.9 | 2.9 | 2.9 |
| f | 15.49 | 21.50 | 44.26 |
| W | 17.7 | 12.5 | 6.0 |
| Y | 4.70 | 4.70 | 4.70 |
| fB | 0.56 | 0.55 | 0.52 |
| L | 75.58 | 75.57 | 75.54 |
| d5 | 1.65 | 9.04 | 18.89 |
| d12 | 9.66 | 8.00 | 1.67 |
| d16 | 10.48 | 4.75 | 1.24 |

TABLE 9

LENS GROUP DATA

| Lens Group | 1$^{st}$ Surf. | Focal Length |
|---|---|---|
| 1 | 1 | 46.54 |
| 2 | 6 | −10.73 |
| 3 | 14 | 30.48 |
| 4 | 17 | 24.70 |

[Numerical Embodiment 4]

Figure 19:
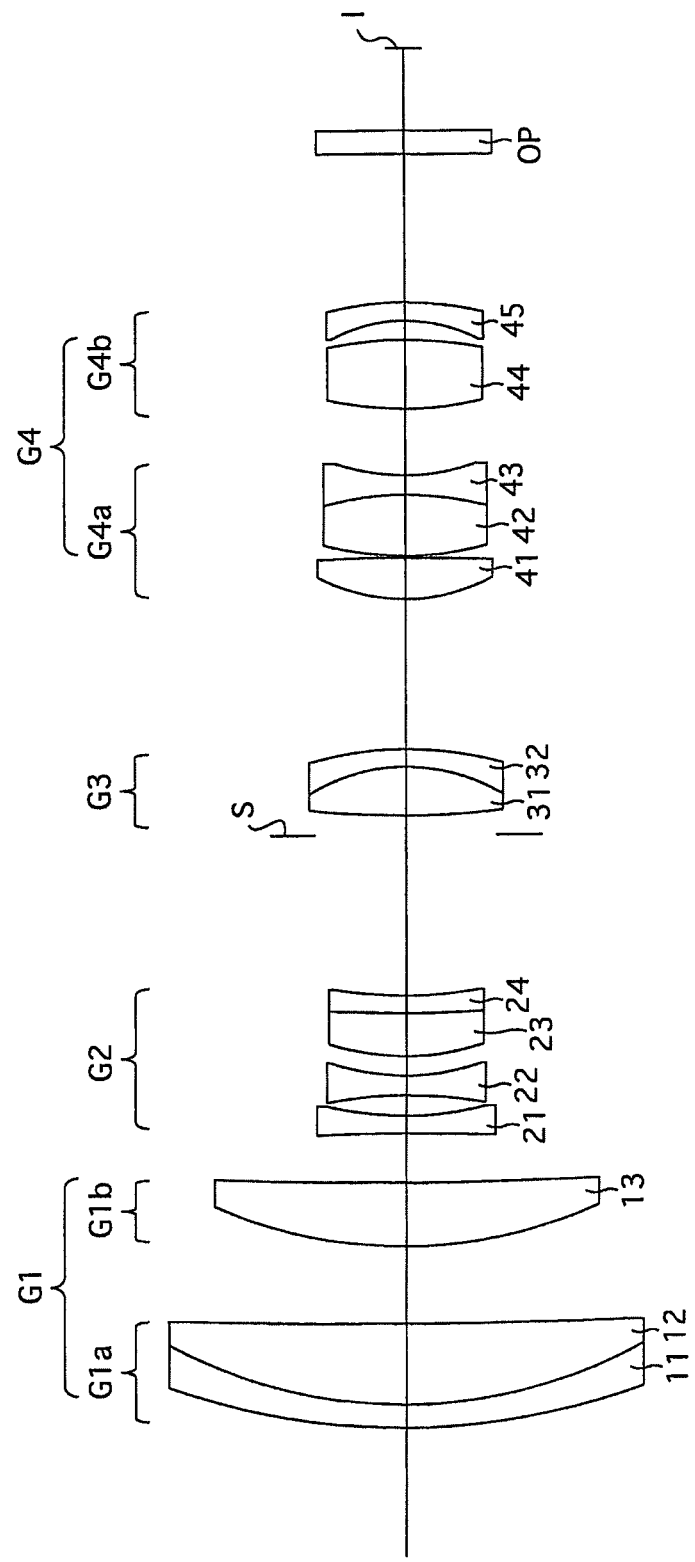
FIG. 19 shows a lens arrangement of a fourth numerical embodiment of a zoom lens system, according to the present invention, at the long focal length extremity when focused on an object at infinity.
Figure 20:
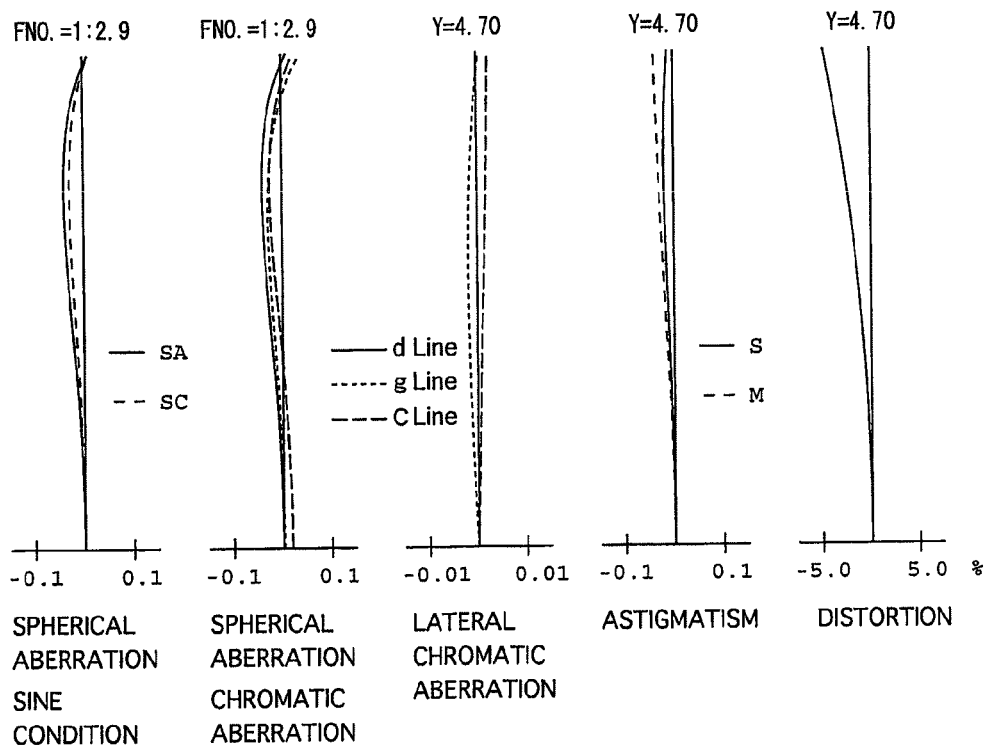
FIG. 20 shows various aberrations that occurred in the lens arrangement of FIG. 19.
Figure 21:
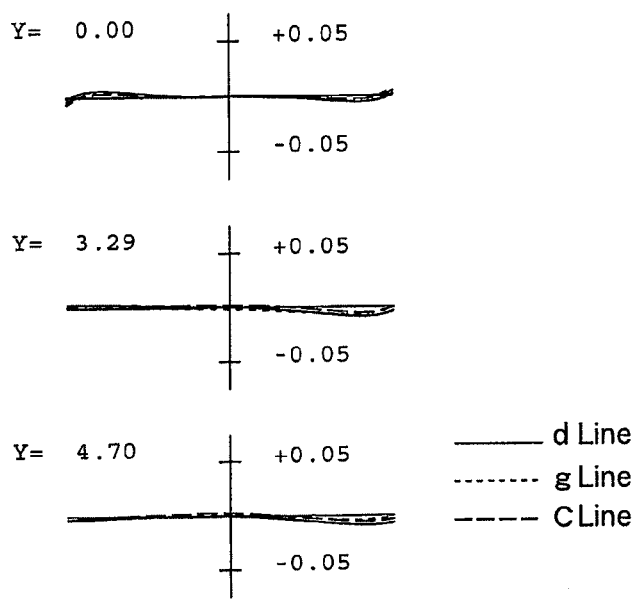
FIG. 21 shows lateral aberrations that occurred in the lens arrangement of FIG. 19.
Figure 22:
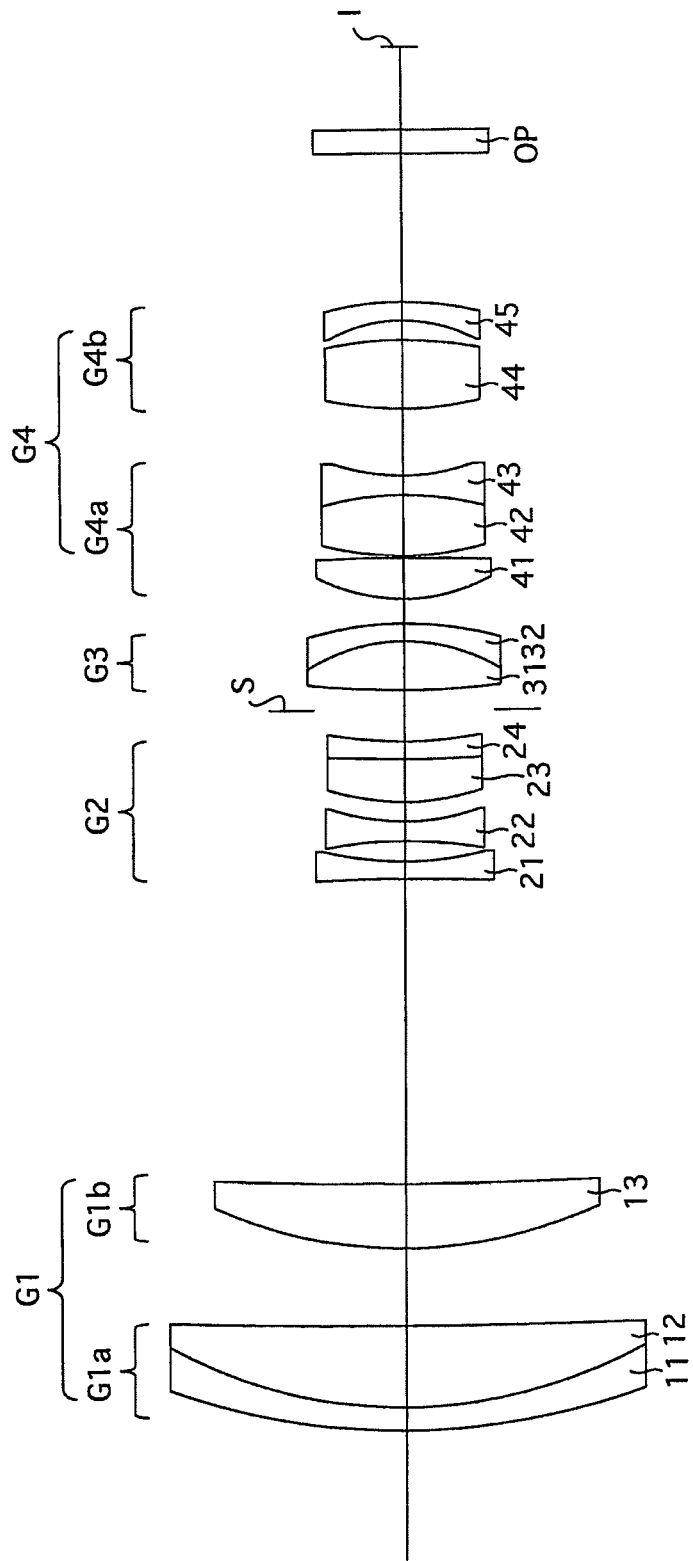
FIG. 22 shows a lens arrangement of the fourth numerical embodiment of a zoom lens system at the short focal length extremity when focused on an object at infinity.
Figure 23:
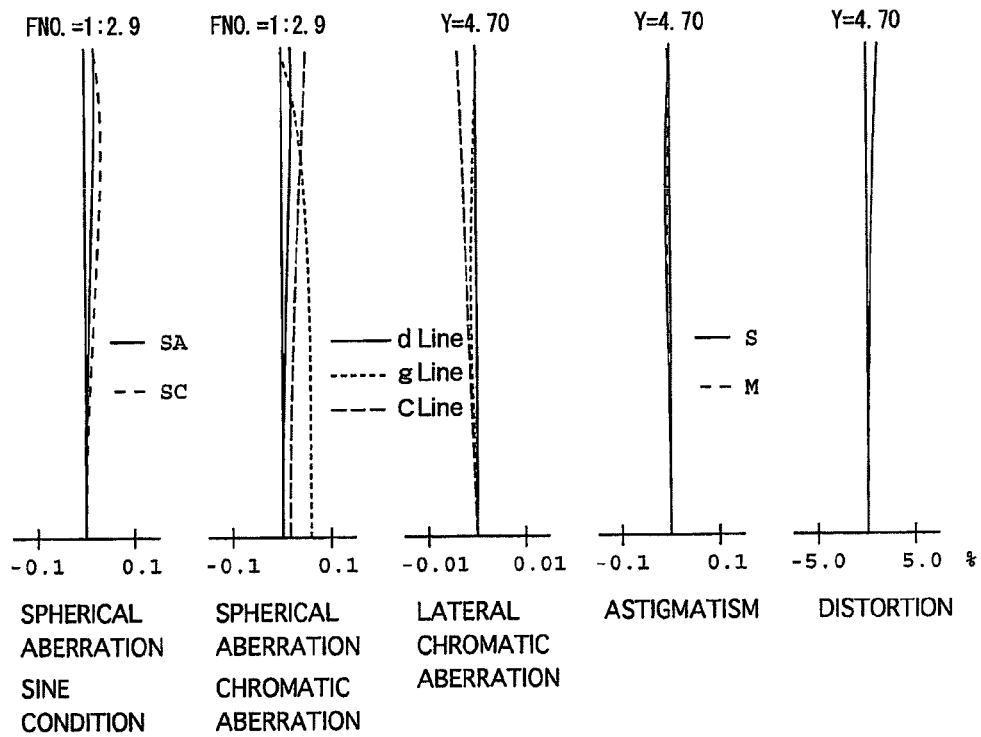
FIG. 23 shows various aberrations that occurred in the lens arrangement of FIG. 22.
Figure 24:
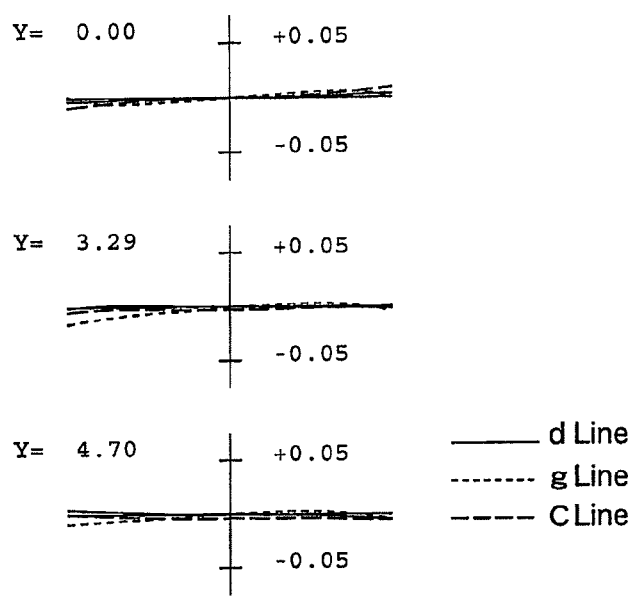
FIG. 24 shows lateral aberrations that occurred in the lens arrangement of FIG. 22.

FIGS. 19 through 24 and Tables 10 through 12 show a fourth numerical embodiment of the zoom lens system according to the present invention. FIG. 19 shows a lens arrangement at the long focal length extremity when focusing on an object at infinity, FIG. 20 shows the various aberrations thereof, FIG. 21 shows the lateral aberrations thereof, FIG. 22 shows a lens arrangement at the short focal length extremity when focusing on an object at infinity, FIG. 23 shows the various aberrations thereof, and FIG. 24 shows the lateral aberrations thereof. Table 10 shows the lens surface data, Table 11 shows various lens-system data, and Table 12 shows the lens group data.

The lens arrangement of the fourth numerical embodiment is the same as that of the first numerical embodiment except for the following points:

(1) The positive lens element 12 of the first lens group G1 is a positive meniscus lens element having a convex surface on the object side.

(2) In the fourth lens group G4, the positive lens element 41 is configured of a biconvex positive lens element, the positive lens element 42 is configured of a biconvex positive lens element, and the negative lens element 43 is configured of a biconcave negative lens element.

TABLE 10

SURFACE DATA

| Surf. No. | R | d | N(d) | ν(d) |
|---|---|---|---|---|
| 1 | 35.763 | 1.20 | 1.80810 | 22.8 |
| 2 | 25.198 | 4.20 | 1.49700 | 81.6 |
| 3 | 353.696 | 4.01 | | |
| 4 | 24.078 | 3.30 | 1.48749 | 70.2 |
| 5 | 228.251 | d5 | | |
| 6 | −135.163 | 0.90 | 1.72916 | 54.7 |
| 7 | 17.044 | 1.05 | | |
| 8 | −22.735 | 1.00 | 1.72916 | 54.7 |
| 9 | 12.022 | 0.99 | | |
| 10 | 12.871 | 2.20 | 1.84666 | 23.8 |
| 11 | 72.878 | 0.90 | 1.72916 | 54.7 |
| 12 | 22.207 | d12 | | |
| 13(Diaphragm) | ∞ | 1.00 | | |
| 14 | 44.133 | 2.50 | 1.60311 | 60.7 |
| 15 | −9.565 | 0.90 | 1.85026 | 32.3 |
| 16 | −18.402 | d16 | | |
| 17 | 9.641 | 2.10 | 1.61800 | 63.4 |
| 18 | −131.855 | 0.10 | | |
| 19 | 16.114 | 3.11 | 1.43875 | 95.0 |
| 20 | −16.498 | 1.00 | 1.81600 | 46.6 |
| 21 | 10.994 | 3.41 | | |
| 22 | 17.765 | 3.50 | 1.69680 | 55.5 |
| 23 | −21.194 | 0.99 | | |
| 24 | −8.164 | 0.95 | 1.83400 | 37.2 |
| 25 | −16.837 | 7.57 | | |
| 26 | ∞ | 1.20 | 1.51633 | 64.1 |
| 27 | ∞ | — | | |

TABLE 11

VARIOUS LENS SYSTEM DATA
Zoom Ratio: 2.83

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.65 |
| W | 17.7 | 10.4 | 6.1 |
| Y | 4.70 | 4.70 | 4.70 |
| fB | 2.75 | 2.75 | 2.75 |
| L | 69.25 | 69.25 | 69.25 |

TABLE 11-continued

VARIOUS LENS SYSTEM DATA
Zoom Ratio: 2.83

|     | Short Focal Length Extremity | Intermediate Focal Length | Long Focal Length Extremity |
|-----|------|-------|-------|
| d5  | 2.50 | 10.57 | 15.57 |
| d12 | 8.22 | 5.81  | 1.60  |
| d16 | 7.69 | 2.03  | 1.25  |

TABLE 12

LENS GROUP DATA

| Lens Group | 1st Surf. | Focal Length |
|---|---|---|
| 1 | 1  | 38.65 |
| 2 | 6  | −8.80 |
| 3 | 14 | 29.53 |
| 4 | 17 | 22.99 |

[Numerical Embodiment 5]

Figure 25:
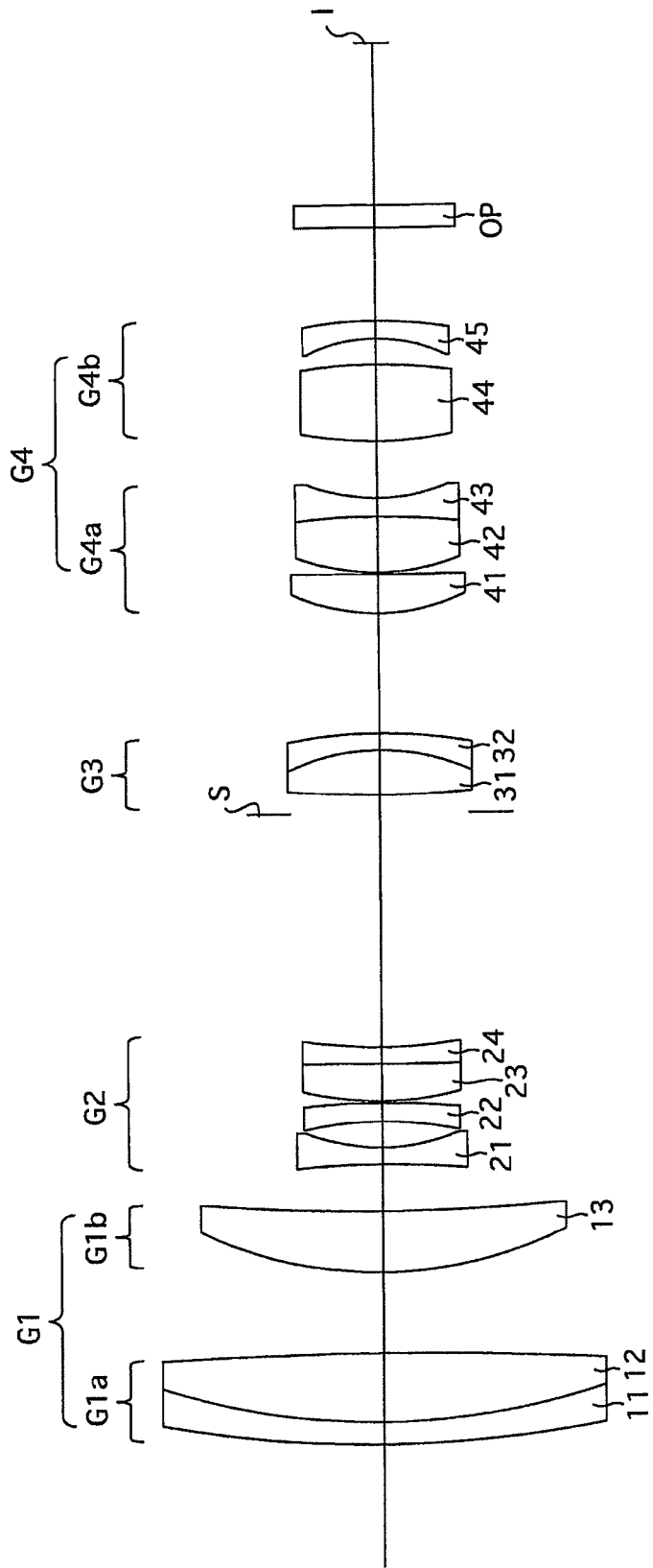
FIG. 25 shows a lens arrangement of a fifth numerical embodiment of a zoom lens system, according to the present invention, at the long focal length extremity when focused on an object at infinity.
Figure 26:
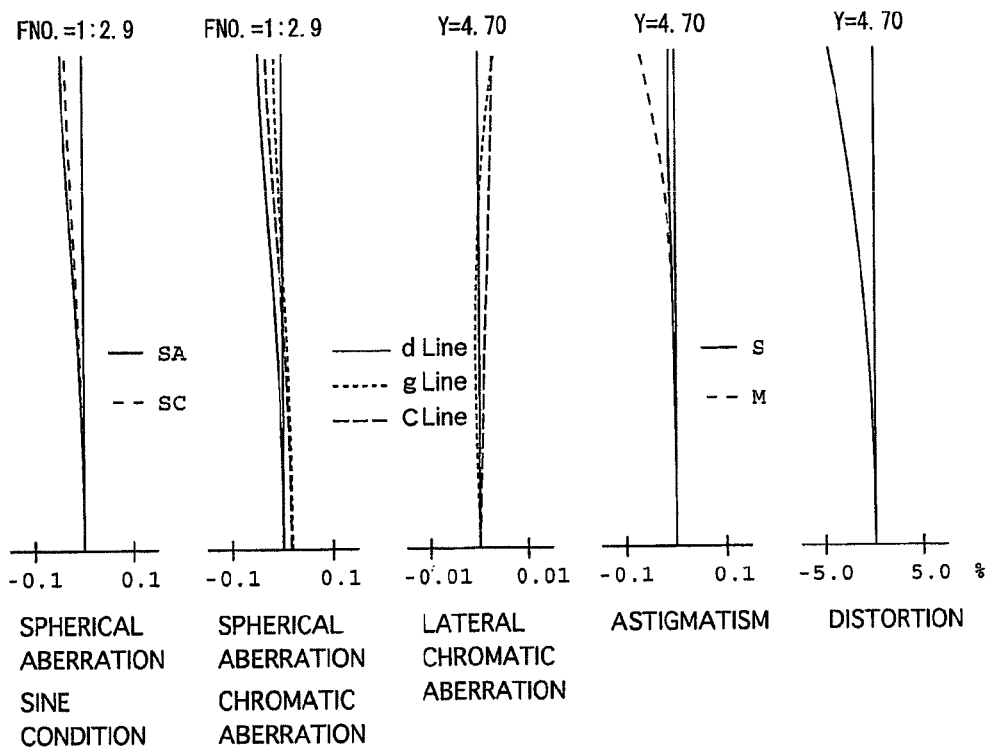
FIG. 26 shows various aberrations that occurred in the lens arrangement of FIG. 25.
Figure 27:
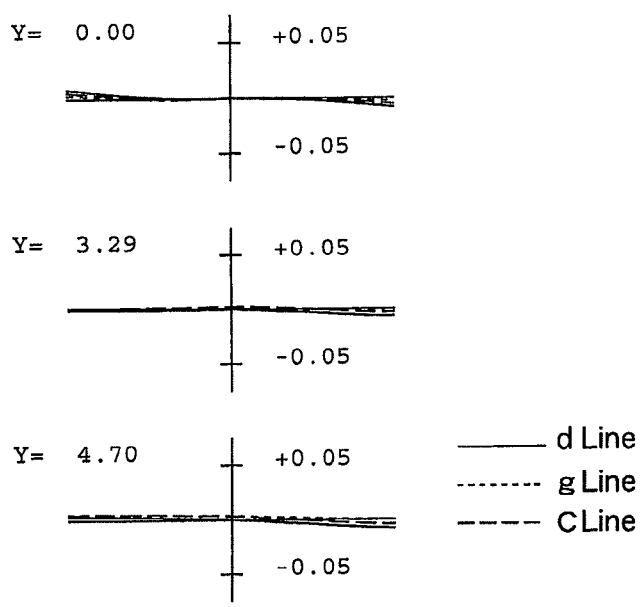
FIG. 27 shows lateral aberrations that occurred in the lens arrangement of FIG. 25.
Figure 28:
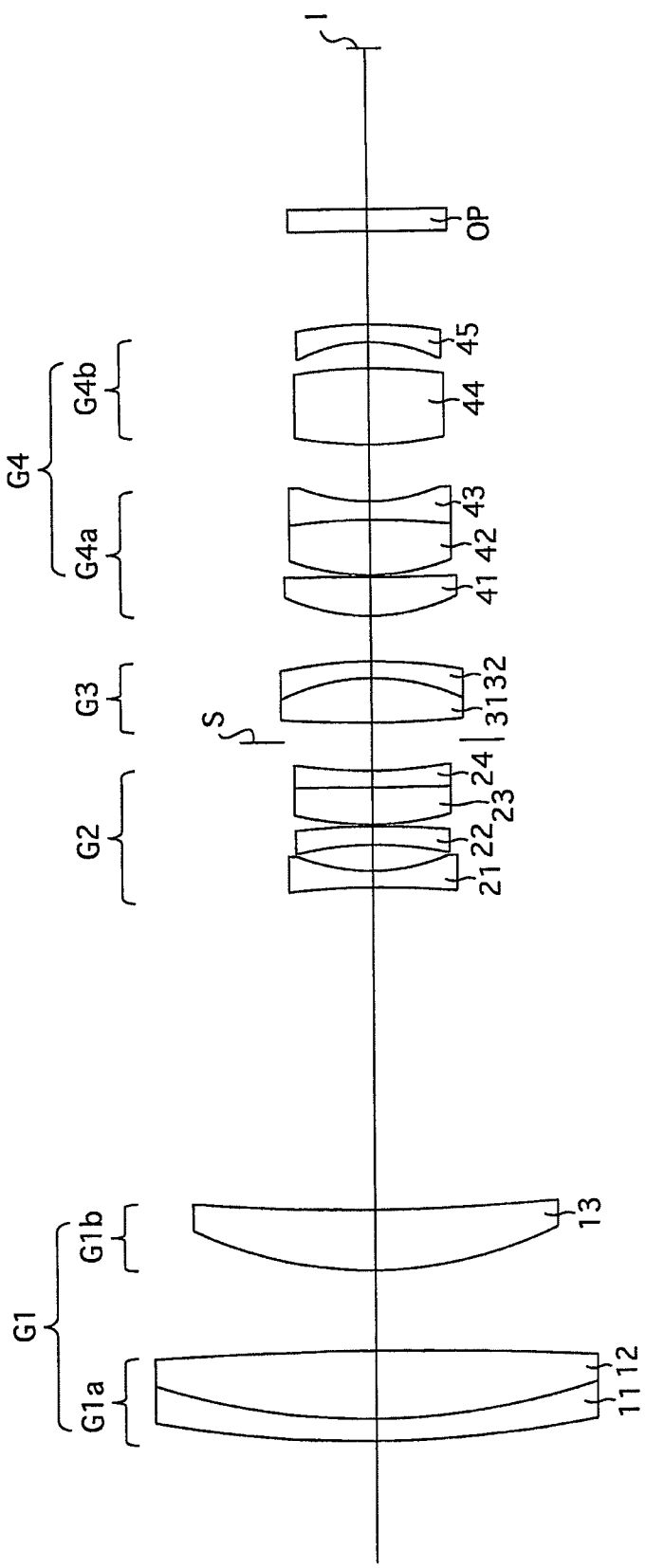
FIG. 28 shows a lens arrangement of the fifth numerical embodiment of a zoom lens system at the short focal length extremity when focused on an object at infinity.
Figure 29:
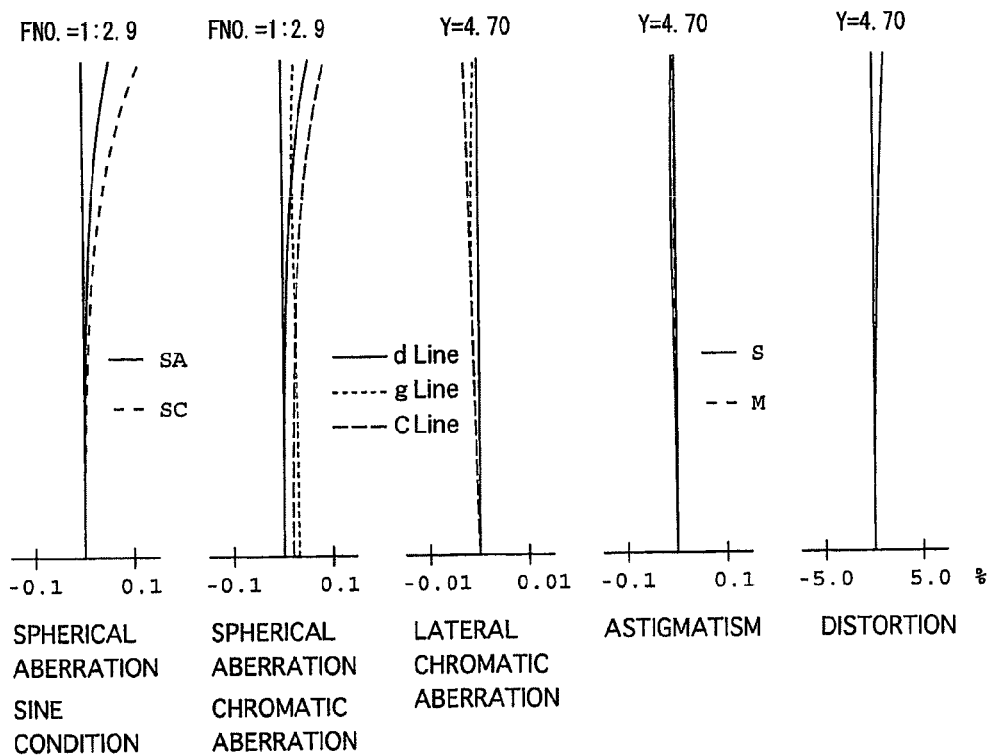
FIG. 29 shows various aberrations that occurred in the lens arrangement of FIG. 28.
Figure 30:
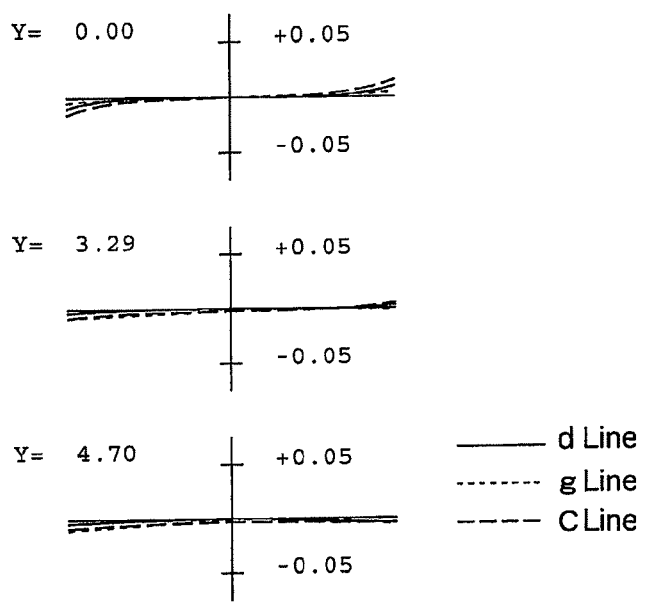
FIG. 30 shows lateral aberrations that occurred in the lens arrangement of FIG. 28.

FIGS. 25 through 30 and Tables 13 through 15 show a fifth numerical embodiment of the zoom lens system according to the present invention. FIG. 25 shows a lens arrangement at the long focal length extremity when focusing on an object at infinity, FIG. 26 shows the various aberrations thereof, FIG. 27 shows the lateral aberrations thereof, FIG. 28 shows a lens arrangement at the short focal length extremity when focusing on an object at infinity, FIG. 29 shows the various aberrations thereof, and FIG. 30 shows the lateral aberrations thereof. Table 13 shows the lens surface data, Table 14 shows various lens-system data, and Table 15 shows the lens group data.

The lens arrangement of the fifth numerical embodiment is the same as that of the first numerical embodiment except for the following points:

(1) The negative lens element 22 of the second lens group G2 is configured of a negative meniscus lens element having a convex surface on the image side.

(2) In the fourth lens group G4, the positive lens element 42 is configured of a biconvex positive lens element, and the negative lens element 43 is configured of a biconcave negative lens element.

TABLE 13

SURFACE DATA

| Surf. No. | R | d | N(d) | ν(d) |
|---|---|---|---|---|
| 1  | 65.158   | 1.20 | 1.80810 | 22.8 |
| 2  | 38.658   | 3.70 | 1.49700 | 81.6 |
| 3  | −222.787 | 4.41 |         |      |
| 4  | 22.703   | 3.30 | 1.48749 | 70.2 |
| 5  | 111.448  | d5   |         |      |
| 6  | −51.534  | 0.90 | 1.75500 | 52.3 |
| 7  | 10.958   | 1.40 |         |      |
| 8  | −18.976  | 1.00 | 1.72916 | 54.7 |
| 9  | −43.739  | 0.10 |         |      |
| 10 | 16.919   | 2.00 | 1.84666 | 23.8 |
| 11 | 500.000  | 0.90 | 1.72916 | 54.7 |
| 12 | 26.515   | d12  |         |      |
| 13(Diaphragm) | ∞ | 1.00 |      |      |
| 14 | 62.812   | 2.40 | 1.60311 | 60.7 |
| 15 | −11.557  | 0.90 | 1.85026 | 32.3 |
| 16 | −26.419  | d16  |         |      |
| 17 | 10.989   | 2.10 | 1.61800 | 63.4 |
| 18 | 413.942  | 0.10 |         |      |
| 19 | 12.126   | 2.98 | 1.43875 | 95.0 |
| 20 | −39.367  | 1.00 | 1.74320 | 49.3 |
| 21 | 10.186   | 3.08 |         |      |
| 22 | 20.988   | 4.09 | 1.80400 | 46.6 |
| 23 | −27.625  | 1.41 |         |      |
| 24 | −8.539   | 0.95 | 1.80000 | 29.9 |
| 25 | −22.601  | 5.00 |         |      |
| 26 | ∞        | 1.20 | 1.51633 | 64.1 |
| 27 | ∞        | —    |         |      |

TABLE 14

VARIOUS LENS SYSTEM DATA
Zoom Ratio: 2.83

|     | Short Focal Length Extremity | Intermediate Focal Length | Long Focal Length Extremity |
|-----|-------|-------|-------|
| FNO. | 2.9   | 2.9   | 2.9   |
| f    | 15.29 | 26.00 | 43.20 |
| W    | 17.9  | 10.4  | 6.1   |
| Y    | 4.70  | 4.70  | 4.70  |
| fB   | 5.50  | 5.50  | 5.50  |
| L    | 72.08 | 72.08 | 72.08 |
| d5   | 2.50  | 11.73 | 17.40 |
| d12  | 12.56 | 8.72  | 1.60  |
| d16  | 6.40  | 1.00  | 2.46  |

TABLE 15

LENS GROUP DATA

| Lens Group | 1st Surf. | Focal Length |
|---|---|---|
| 1 | 1  | 43.21  |
| 2 | 6  | −12.13 |
| 3 | 14 | 48.96  |
| 4 | 17 | 21.71  |

[Numerical Embodiment 6]

Figure 31:
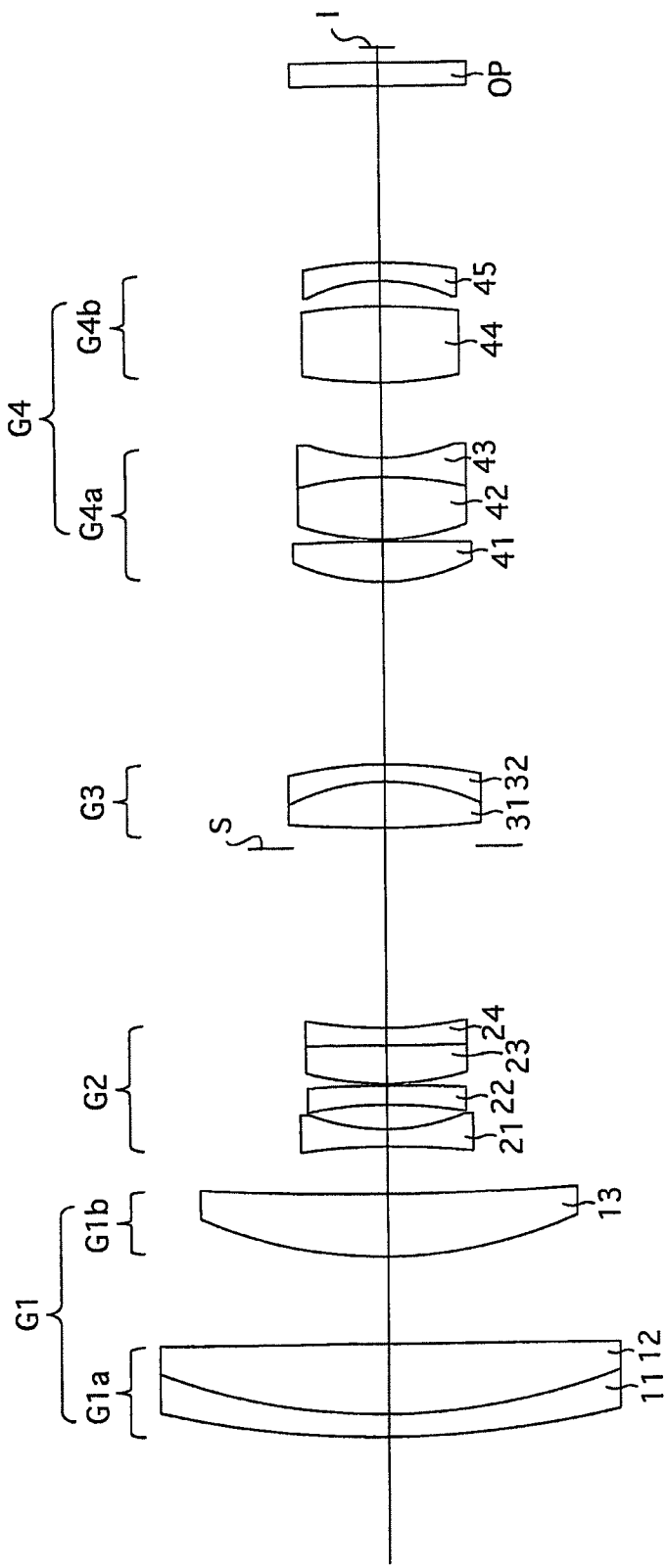
FIG. 31 shows a lens arrangement of a sixth numerical embodiment of a zoom lens system, according to the present invention, at the long focal length extremity when focused on an object at infinity.
Figure 32:
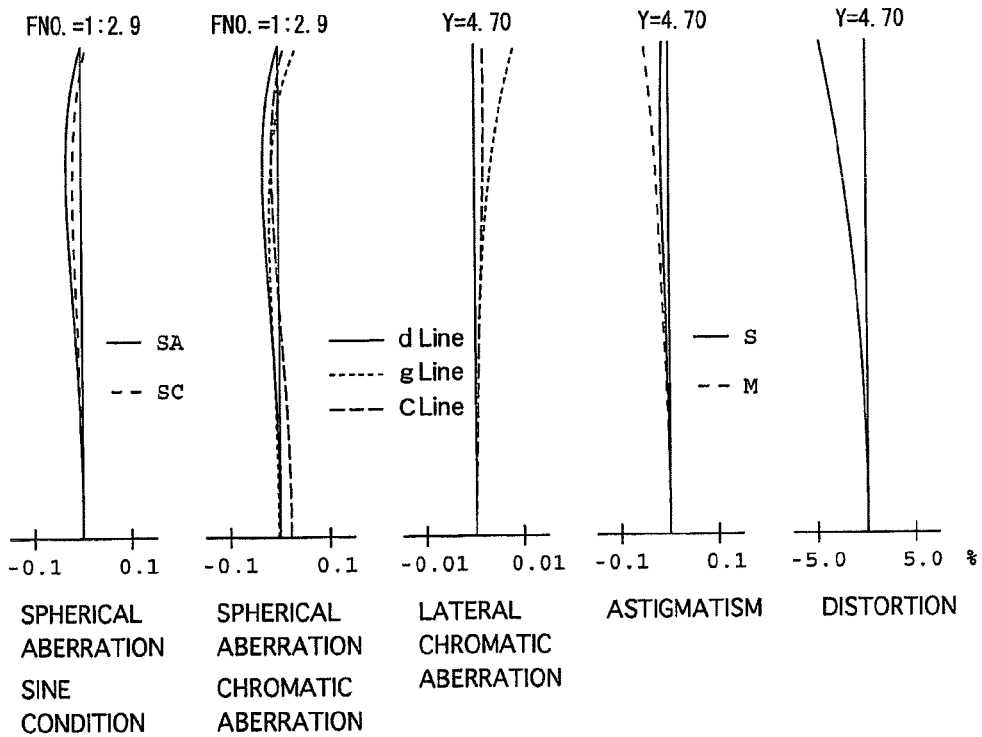
FIG. 32 shows various aberrations that occurred in the lens arrangement of FIG. 31.
Figure 33:
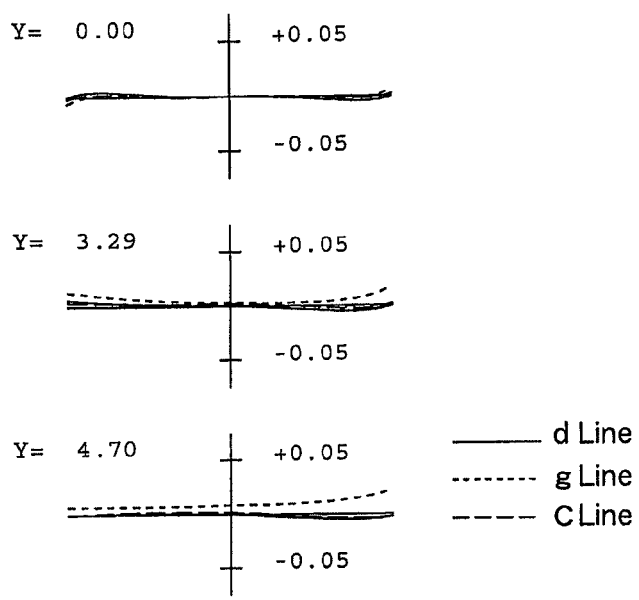
FIG. 33 shows lateral aberrations that occurred in the lens arrangement of FIG. 31.
Figure 34:
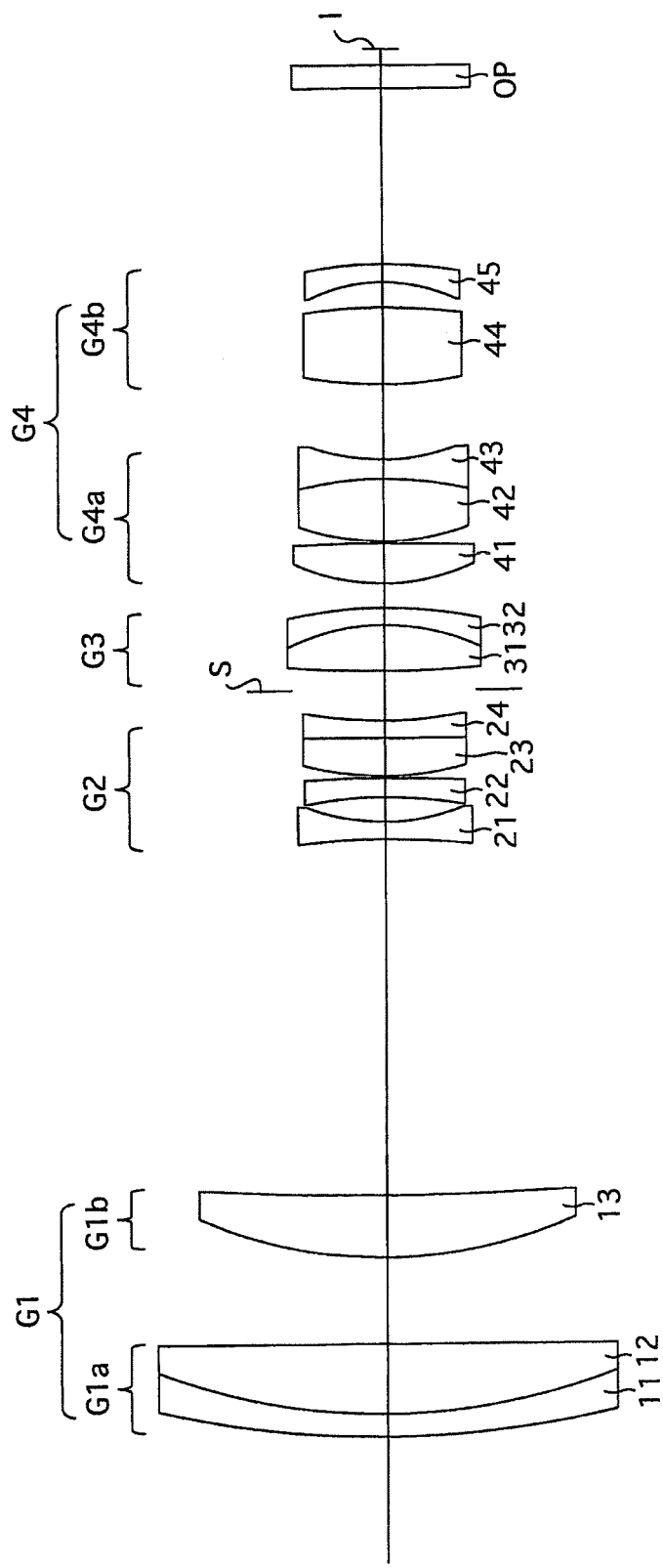
FIG. 34 shows a lens arrangement of the sixth numerical embodiment of a zoom lens system at the short focal length extremity when focused on an object at infinity.
Figure 35:
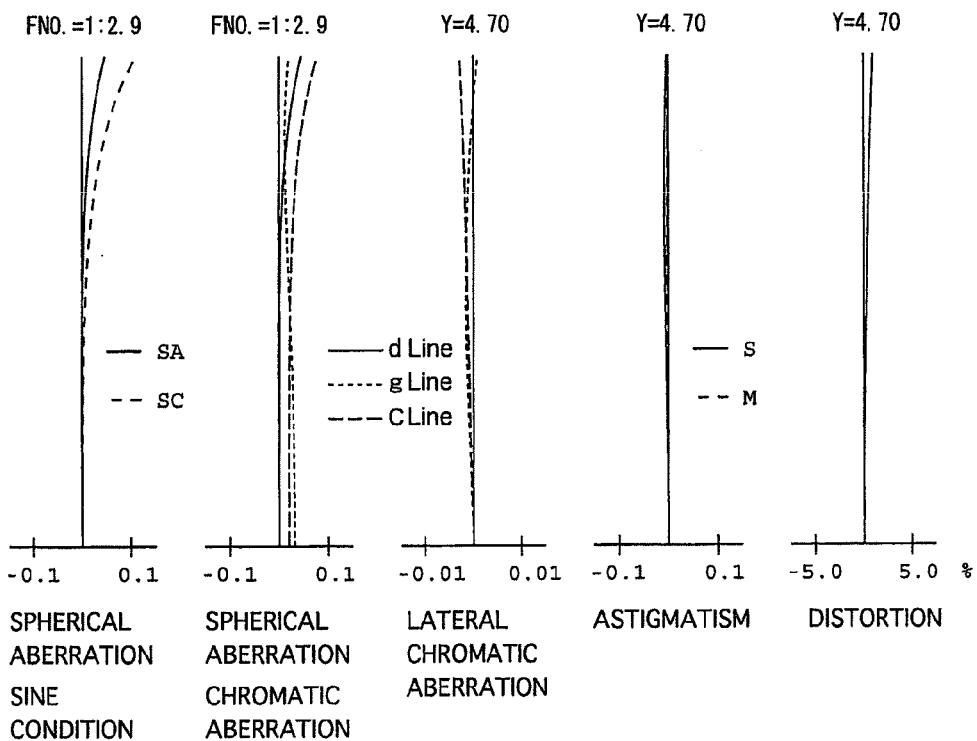
FIG. 35 shows various aberrations that occurred in the lens arrangement of FIG. 34.
Figure 36:
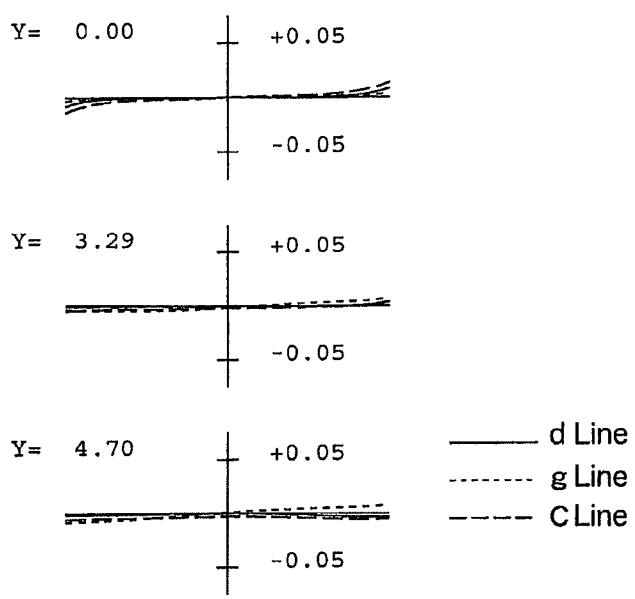
FIG. 36 shows lateral aberrations that occurred in the lens arrangement of FIG. 34.

FIGS. 31 through 36 and Tables 16 through 18 show a sixth numerical embodiment of the zoom lens system according to the present invention. FIG. 31 shows a lens arrangement at the long focal length extremity when focusing on an object at infinity, FIG. 32 shows the various aberrations thereof, FIG. 33 shows the lateral aberrations thereof, FIG. 34 shows a lens arrangement at the short focal length extremity when focusing on an object at infinity, FIG. 35 shows the various aberrations thereof, and FIG. 36 shows the lateral aberrations thereof. Table 16 shows the lens surface data, Table 17 shows various lens-system data, and Table 18 shows the lens group data.

The lens arrangement of the sixth numerical embodiment is the same as that of the first numerical embodiment except for the following points:

(1) The positive lens element 12 of the first lens group G1 is configured of a planoconvex positive lens element having a convex surface on the object side.

(2) The negative lens element 22 of the second lens group G2 is configured of a negative meniscus lens element having a convex surface on the image side.

(3) In the fourth lens group G4, the positive lens element 41 is configured of a biconvex positive lens element, the positive lens element 42 is configured of a biconvex positive lens element, and the negative lens element 43 is configured of a biconcave negative lens element.

TABLE 16

SURFACE DATA

| Surf. No. | R | d | N(d) | v(d) |
|---|---|---|---|---|
| 1 | 53.022 | 1.20 | 1.80810 | 22.8 |
| 2 | 33.737 | 3.70 | 1.49700 | 81.6 |
| 3 | ∞ | 4.58 | | |
| 4 | 24.408 | 3.30 | 1.48749 | 70.2 |
| 5 | 160.088 | d5 | | |
| 6 | −39.224 | 0.90 | 1.75500 | 52.3 |
| 7 | 11.146 | 1.28 | | |
| 8 | −23.058 | 1.00 | 1.72916 | 54.7 |
| 9 | −86.125 | 0.10 | | |
| 10 | 15.389 | 2.00 | 1.84666 | 23.8 |
| 11 | 500.000 | 0.90 | 1.72916 | 54.7 |
| 12 | 21.977 | d12 | | |
| 13(Diaphragm) | ∞ | 1.00 | | |
| 14 | 61.966 | 2.40 | 1.60311 | 60.7 |
| 15 | −11.543 | 0.90 | 1.85026 | 32.3 |
| 16 | −23.543 | d16 | | |
| 17 | 11.096 | 2.10 | 1.61800 | 63.4 |
| 18 | −132.586 | 0.10 | | |
| 19 | 12.995 | 3.26 | 1.43875 | 95.0 |
| 20 | −19.170 | 1.00 | 1.74400 | 44.8 |
| 21 | 11.064 | 3.92 | | |
| 22 | 21.949 | 3.99 | 1.80610 | 33.3 |
| 23 | −31.758 | 1.32 | | |
| 24 | −8.960 | 0.95 | 1.80810 | 22.8 |
| 25 | −21.977 | 9.16 | | |
| 26 | ∞ | 1.20 | 1.51633 | 64.1 |
| 27 | ∞ | — | | |

TABLE 17

VARIOUS LENS SYSTEM DATA
Zoom Ratio: 2.83

| | Short Focal Length Extremity | Intermediate Focal Length | Long Focal Length Extremity |
|---|---|---|---|
| FNO. | 2.9 | 2.9 | 2.9 |
| f | 15.48 | 26.00 | 43.72 |
| W | 17.7 | 10.4 | 6.1 |
| Y | 4.70 | 4.70 | 4.70 |
| fB | 0.68 | 0.68 | 0.68 |
| L | 72.39 | 72.39 | 72.39 |
| d5 | 2.50 | 12.22 | 18.57 |
| d12 | 9.46 | 6.84 | 1.60 |
| d16 | 9.49 | 2.40 | 1.28 |

TABLE 18

LENS GROUP DATA

| Lens Group | 1$^{st}$ Surf. | Focal Length |
|---|---|---|
| 1 | 1 | 44.82 |
| 2 | 6 | −11.17 |
| 3 | 14 | 40.95 |
| 4 | 17 | 21.45 |

The numerical values of each condition for each embodiment are shown in Table 19.

TABLE 19

| | Embod. 1 | Embod. 2 | Embod. 3 |
|---|---|---|---|
| Cond. (1) | 70.2 | 70.2 | 70.2 |
| Cond. (2) | 22.76 | 22.76 | 22.76 |
| Cond. (3) | 1.18 | 1.23 | 1.24 |
| Cond. (4) | −0.245 | −0.243 | −0.242 |
| Cond. (5) | 4.88 | 4.88 | 4.88 |
| Cond. (6) | 0.297 | 0.297 | 0.297 |
| Cond. (7) | 2.46 | 2.46 | 2.46 |

TABLE 19-continued

| | Embod. 4 | Embod. 5 | Embod. 6 |
|---|---|---|---|
| Cond. (1) | 70.2 | 70.2 | 70.2 |
| Cond. (2) | 22.76 | 22.76 | 22.76 |
| Cond. (3) | 1.24 | 1.51 | 1.36 |
| Cond. (4) | −0.202 | −0.281 | −0.256 |
| Cond. (5) | 5.30 | 4.84 | 4.50 |
| Cond. (6) | 0.225 | 0.196 | 0.236 |
| Cond. (7) | 2.46 | 2.46 | 2.46 |

As can be understood from Table 19, the first through sixth embodiments satisfy conditions (1) through (7). Furthermore, as can be understood from the various aberration diagrams and lateral aberration diagrams, the various aberrations and the lateral aberrations are relatively well corrected.

The technical scope of the invention pertaining to the present invention would not be evaded even if a lens element or lens group which has, in effect, no optical power were to be added to a zoom lens system that is included in the technical scope of the invention pertaining to the present patent application.

INDUSTRIAL APPLICABILITY

The zoom lens system of the present invention and an electronic imaging apparatus provided with such a zoom lens system are suitable for use in, for example, an electronic imaging apparatus such as a digital camera, etc.

REFERENCE SIGNS LIST

G1 Positive first lens group
G1a Positive first sub-lens group
11 Negative lens element
12 Positive lens element
G1b Second sub-lens group
13 Positive single lens element
G2 Negative second lens group
21 Negative lens element (negative lens element having a concave surface on the image side)
22 Negative lens element (negative lens element having a concave surface on the image side)
23 Positive lens element
24 Negative lens element
G3 Positive third lens group
31 Positive lens element
32 Negative lens element
G4 Positive fourth lens group
G4a Positive third sub-lens group
41 Positive lens element
42 Positive lens element
43 Negative lens element
G4b Positive fourth sub-lens group
44 Positive lens element
45 Negative lens element
S Diaphragm
OP Optical filter
I Imaging plane

The invention claimed is:

1. A zoom lens system comprising a positive first lens group, a negative second lens group, a positive third lens group, and a positive fourth lens group, in that order from the object side, wherein at least said second lens group and said third lens group are moved during zooming from the short focal length extremity to the long focal length extremity, and a distance, along an optical axis direction, between the positive third lens group and the positive fourth lens group varies during a zooming operation,
wherein said first lens group includes a positive first sub-lens group which does not move during a focusing operation, and a positive second sub-lens group, serving as a focusing lens group, which moves during the focusing operation, in that order from the object side, wherein said first sub-lens group comprises at least one negative lens element, wherein said second sub-lens group comprises a positive single lens element, and wherein the following relationships are satisfied:

$60 < vd1b < 75$ and $vd1a < 24$ wherein vd1b designates the Abbe number at the d-line of said positive single lens element of the second sub-lens group, and vd1a designates the Abbe number at the d-line of said at least one negative lens element within said first sub-lens group, wherein said second lens group consists of a negative lens element having a concave surface on the image side, a negative lens element having a concave surface on the image side, and a cemented lens including a positive lens element and a negative lens element, in that order from the object side, and wherein each of the positive lens element and the negative lens element, which constitute the cemented lens of said second lens group, comprises a convex surface on the object side thereof and a concave surface on the image side thereof.

2. The zoom lens system according to claim 1, wherein the following relationship is satisfied:

$1.0 < SP1b < 1.8$ wherein

SP1b designates the shape factor of the positive single lens element of said second sub-lens group, $SP1b = (R2+R1)/(R2-R1)$, R1 designates the radius of curvature of the surface on the object side of the positive single lens element of said second sub-lens group, and R2 designates the radius of curvature of the surface on the image side of the positive single lens element of said second sub-lens group.

3. The zoom lens system according to claim 1, wherein the following relationships are satisfied:

$-0.3 < f2/ft < -0.18$ and $4.5 < TL/ST2 < 5.5$ wherein f2 designates the focal length of said second lens group, ft designates the focal length of the entire lens system at the long focal length extremity, TL designates the entire length of the lens system at the long focal length extremity, and ST2 designates a movement amount of said second lens group during zooming from the short focal length extremity to the long focal length extremity.

4. The zoom lens system according to claim 1, wherein said fourth lens group comprises a third sub-lens group provided with at least one positive lens element and negative lens element, and a fourth sub-lens group provided with at least one positive lens element and negative lens element, in that order from the object side, and wherein the following relationship is satisfied:

$0.15 < D4/LD4 < 0.35$ wherein

D4 designates an air-distance between said third sub-lens group and said fourth sub-lens group, and LD4 designates the distance between a surface closest to the object side of said fourth lens group to a surface closest to the image side thereof.

5. The zoom lens system according to claim 1, wherein the following relationship is satisfied:

$SG1b < 2.8$ wherein

SG1b designates the specific gravity of the positive single lens element of said second sub-lens group.

6. An electronic imaging apparatus comprising:
said zoom lens system according to claim 1; and
an imaging device which converts an image formed by said zoom lens system into electrical signals.

7. The zoom lens system according to claim 1, wherein, when a zooming operation is performed, a distance between said positive first lens group and said negative second lens group varies, a distance between said negative second lens group and said positive third lens group varies, and a distance between said positive third lens group and said positive fourth lens group varies.

8. A zoom lens system comprising a positive first lens group, a negative second lens group, a positive third lens group, and a positive fourth lens group, in that order from the object side, wherein at least said second lens group and said third lens group are moved during zooming from the short focal length extremity to the long focal length extremity, and a distance, in an optical axis direction, between the positive third lens group and the positive fourth lens group varies during a zooming operation, wherein said first lens group includes a positive first sub-lens group provided with at least one negative lens element, and a positive second sub-lens group comprising a positive single lens element, in that order from the object side, and wherein the following relationship is satisfied:

$vd1a < 22.85$ wherein vd1a designates the Abbe number at the d-line of the negative lens element that is positioned closest to the object side within said first sub-lens group and wherein said second lens group consists of a negative lens element having a concave surface on the image side, a negative lens element having a concave surface on the image side, and a cemented lens including a positive lens element and a negative lens element, in that order from the object side, and wherein each of the positive lens element and the negative lens element, which constitute the cemented lens of said second lens group, comprises a convex surface on the object side thereof and a concave surface on the image side thereof.

9. A zoom lens system comprising a positive first lens group, a negative second lens group, a positive third lens group, and a positive fourth lens group, in that order from an object side, wherein at least said second lens group and said third lens group are moved during zooming from the short focal length extremity to the long focal length extremity, and the distance, in an optical axis direction, between the positive third lens group and the positive fourth lens group varies during a zooming operation, wherein said first lens group includes a positive first sub-lens group provided with at least one negative lens element, and a positive second sub-lens group comprising a positive single lens element, in that order from the object side, wherein said second lens group consists of a negative lens element having a concave surface on the image side, a negative lens element having a concave surface on the image side, and a cemented lens including a positive lens element and a negative lens element, in that order from the object side, and wherein each of the positive lens element and the negative lens element, which constitute the cemented lens of said second lens group, comprises a convex surface on the object side thereof and a concave surface on the image side thereof.

10. The zoom lens system according to claim 9, wherein said first lens group includes a positive first sub-lens group which does not move during a focusing operation, and a positive second sub-lens group, serving as a focusing lens group, which moves during the focusing operation, in that order from the object side, wherein said first sub-lens group comprises at least one negative lens element, wherein said second sub-lens group comprises a positive single lens element, and wherein the following relationships are satisfied:

$$60 < vd1b < 75$$

and $$vd1a < 24$$

wherein vd1b designates the Abbe number at the d-line of said positive single lens element of the second sub-lens group, and vd1a designates the Abbe number at the d-line of said at least one negative lens element within said first sub-lens group.

11. The zoom lens system according to claim 9, wherein the following relationship is satisfied:

$$vd1a < 22.85$$

wherein vd1a designates the Abbe number at the d-line of the negative lens element that is positioned closest to the object side within said first sub-lens group.

12. The zoom lens system according to claim 9, wherein the following relationships are satisfied:

$$-0.3 < f2/ft < -0.18$$

and $$4.5 < TL/ST2 < 5.5$$

wherein f2 designates the focal length of said second lens group,
ft designates the focal length of the entire lens system at the long focal length extremity,
TL designates the entire length of the lens system at the long focal length extremity, and
ST2 designates a movement amount of said second lens group during zooming from the short focal length extremity to the long focal length extremity.

13. The zoom lens system according to claim 9, wherein said fourth lens group comprises a third sub-lens group provided with at least one positive lens element and negative lens element, and a fourth sub-lens group provided with at least one positive lens element and negative lens element, in that order from the object side, and wherein the following relationship is satisfied:

$$0.15 < D4/LD4 < 0.35$$

wherein

D4 designates an air-distance between said third sub-lens group and said fourth sub-lens group, and
LD4 designates the distance between a surface closest to the object side of said fourth lens group to a surface closest to the image side thereof.

14. The zoom lens system according to claim 9, wherein the following relationship is satisfied:

$$SG1b < 2.8$$

wherein

SG1b designates the specific gravity of the positive single lens element of said second sub-lens group.

15. An electronic imaging apparatus comprising:

said zoom lens system according to claim 9; and
an imaging device which converts an image formed by said zoom lens system into electrical signals.

16. The zoom lens system according to claim 9, wherein, when a zooming operation is performed, a distance between said positive first lens group and said negative second lens group varies, a distance between said negative second lens group and said positive third lens group varies, and a distance between said positive third lens group and said positive fourth lens group varies.

17. The zoom lens system according to claim 9, wherein the following relationship is satisfied:

$$1.0 < SP1b < 1.8$$

wherein

SP1b designates the shape factor of the positive single lens element of said second sub-lens group, $$SP1b = (R2+R1)/(R2-R1),$$

R1 designates the radius of curvature of the surface on the object side of the positive single lens element of said second sub-lens group, and
R2 designates the radius of curvature of the surface on the image side of the positive single lens element of said second sub-lens group.

* * * * *